(12) United States Patent
Sato et al.

(10) Patent No.: US 6,909,093 B2
(45) Date of Patent: Jun. 21, 2005

(54) INFRARED DETECTING ELEMENT, METHOD OF MANUFACTURING THE SAME AND TEMPERATURE MEASURING DEVICE

(75) Inventors: Shigemi Sato, Asahi-mura (JP); Hideto Yamashita, Suwa (JP); Tsutomu Hagihara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 10/258,641

(22) PCT Filed: Jan. 31, 2002

(86) PCT No.: PCT/JP02/00812

§ 371 (c)(1),
(2), (4) Date: Oct. 25, 2002

(87) PCT Pub. No.: WO02/075262

PCT Pub. Date: Sep. 26, 2002

(65) Prior Publication Data

US 2003/0111605 A1 Jun. 19, 2003

(30) Foreign Application Priority Data

Mar. 16, 2001 (JP) .......................................... 2001-076033

(51) Int. Cl.[7] .................................................. G01J 5/20
(52) U.S. Cl. ................................. 250/338.4; 250/338.1
(58) Field of Search .......................... 250/338.4, 338.1; 374/120; 136/227

(56) References Cited

U.S. PATENT DOCUMENTS

| | | | | |
|---|---|---|---|---|
| 3,921,453 A | * | 11/1975 | Platzer, Jr. | .................. 374/181 |
| 4,456,919 A | * | 6/1984 | Tomita et al. | .............. 374/132 |
| 5,056,929 A | * | 10/1991 | Watanabe et al. | ........... 374/181 |
| 5,393,351 A | | 2/1995 | Kinard et al. | |
| 6,219,573 B1 | * | 4/2001 | Pompei | ...................... 600/474 |
| 6,294,787 B1 | | 9/2001 | Schieferdecker et al. | |

FOREIGN PATENT DOCUMENTS

| | | |
|---|---|---|
| JP | 55-59319 | 5/1980 |
| JP | 3-195931 | 8/1991 |
| JP | 7-34333 | 6/1995 |
| JP | 8-101070 | 4/1996 |
| JP | 9-89655 | 4/1997 |
| JP | 10-227697 | 8/1998 |
| JP | 2000-131147 | 5/2000 |

OTHER PUBLICATIONS

Sensor Device Structure of Thermopile Sensor Technology, Jul. 1986 (vol. 6, No. 8), author not identified by applicant pp 66–68.

* cited by examiner

Primary Examiner—Constantine Hannaher

(57) ABSTRACT

To provide a thermopile infrared detecting element capable of accurate temperature measurement at low cost. An infrared detecting element 1 using a silicon nitride film as a first structure layer 22 constituting a structure of a membrane portion 4 is provided. Unlike silicon oxide, the first structure layer 22 has internal stress in the tensile direction, and can thus prevent the occurrence of bending. Also, diodes D1 and D2 can be formed in a silicon substrate 2 by using the first structure layer 22 as an element isolation region, and thus deformation of a thermopile 12 due to a change in the environment can be prevented to suppress measurement error of the thermopile 12. Furthermore, a high accuracy infrared detecting element capable of accurately detecting the temperature of cold junctions using the diodes D1 and D2 can be provided.

29 Claims, 23 Drawing Sheets

1: INFRARED DETECTING ELEMENT
2: SILICON SUBSTRATE
4: MEMBRANE PORTION
11: INFRARED ABSORBER
12: THERMOPILE
14: THERMOCOUPLE
D1, D2: DIODE

- 1: INFRARED DETECTING ELEMENT
- 2: SILICON SUBSTRATE
- 4: MEMBRANE PORTION
- 11: INFRARED ABSORBER
- 12: THERMOPILE
- 14: THERMOCOUPLE
- 17: HOT JUNCTION
- 18: COLD JUNCTION
- 21: FIRST JUNCTION LAYER
- 22: FIRST STRUCTURE LAYER
- D1, D2: DIODE

PRIOR ART

INFRARED DETECTING ELEMENT, METHOD OF MANUFACTURING THE SAME AND TEMPERATURE MEASURING DEVICE

BACKGROUND OF THE INVENTION

1. Technical Field

The present invention relates to a thermopile infrared detecting element and a method of manufacturing the same.

2. Background Art

Infrared radiation is emitted from the surface of a human body in an amount according to the body temperature, and ears have the normal temperature like the axillae. Therefore, clinical ear thermometers (temperature measuring devices) for measuring the body temperatures by detecting infrared radiation emitted in the ear cavities are known. In the clinical ear thermometers, the body temperatures are determined based on output from infrared detecting elements for converting received infrared radiation into electrical signals. Although various types of elements such as a pyroelectric type, a thermopile type, and the like are generally known as infrared detecting elements, thermopile-type infrared detecting elements having the merit of permitting mass production using a semiconductor manufacturing process and miniaturization are used as thermosensitive elements of clinical thermometers. Hereafter, the thermopile-type infrared detecting elements are simply referred to as "infrared detecting elements" unless otherwise stated.

FIG. 26 schematically shows an infrared sensor 100 provided with a thermopile infrared detecting element 110. The infrared sensor 100 comprises the infrared detecting element 110 provided with a thermopile 12, and a thermistor 120, the infrared detecting element 110 and the thermistor 120 being mounted on a package substrate 130, and contained in a case 140 to form a unit as a whole. In the infrared sensor 100, the thermistor 120 is used for determining the reference temperature of the thermopile 12 formed on the infrared detecting element 110, i.e., it is used for determining the temperature of cold junctions.

The infrared detecting element 110 comprises a membrane portion 116 comprising a membrane formed by etching a silicon substrate 2 to hollow the central portion 10 of the lower portion or the back side, and a thick wall portion 117 remaining unetched after etching of the silicon substrate 2. Namely, the infrared detecting element 110 has a structure in which the central portion of the lower side of silicon substrate 2 is made hollow to form a thin film (membrane) at the top. Also, gold black is deposited on the central portion 10 of the silicon substrate 2, i.e., on the membrane portion 116, by a sputtering deposition method or the like to form an infrared absorber 11 absorbing infrared radiation.

This infrared absorber 11 absorbs infrared radiation to cause a temperature change so that the temperature change is detected by a plurality of thermocouples 14 provided on the four sides of the infrared absorber 11. The hot junction 17 of each of the thermocouples 14 is disposed near the infrared absorber 11 of the membrane portion 116, and the cold junction 18 of each of the thermocouples 14 is disposed above the thick wall portion 117 in the peripheral portion 9 of the silicon substrate 2. The thermocouples 14 are connected in series to form the thermopile 12.

In a temperature measuring device using the infrared sensor 100, an electromotive force corresponding to a temperature change produced between the hot junctions 17 and the cold junctions 18 of the thermopile 12 is first detected, and a temperature difference between the hot junctions 17 and the cold junctions 18 is calculated based on the output voltage. Then, the temperature of the cold junctions 18 is calculated based on output of the thermistor 120, and the temperature difference is corrected by the temperature of the cold junctions 18 to determine a body temperature. However, the thermistor 120 used for determining the temperature of the cold junctions 18 of the thermopile 12 is disposed in a side portion at a certain distance from the infrared detecting element 110, and thus the peripheral temperature of the infrared detecting element 110 is simply detected. Therefore, it cannot be said that the accurate temperature of the cold junctions is detected. Thus, a large error possibly occurs in the body temperature determined as described above. Particularly, a clinical thermometer is required to have an accuracy of ±0.1° C. in the temperature range of 37° C. to 39° C., and required to perform temperature measurement with high accuracy, thereby causing the need to decrease such an error as much as possible.

The infrared sensor 100 is also required to have a space for arranging the thermistor 120, and thus has a problem in which the element itself cannot be made compact. Therefore, even when the thermistor 120 can be arranged in contact with the infrared sensor 100 to improve the accuracy of the cold junction temperature detected by the thermistor 120, the infrared detecting element cannot be readily effectively arranged in a compact form.

Accordingly, the applicant proposes an infrared detecting element comprising a PN junction, for example, a diode, incorporated into the silicon substrate 2, wherein the cold junction temperature is detected by using the fact that a forward voltage drop of the diode approximately linearly changes depending upon temperature.

This infrared detecting element can accurately detect the cold junction temperature, and can be arranged in a very compact form.

FIG. 27 is a cross-sectional view showing a portion of the infrared detecting element. The infrared detecting element 150 shown in FIG. 27 comprises a diode D formed in the peripheral portion 9 of the silicon substrate 2 so that the temperature of the cold junctions 18 of the thermopile 12 is detected by the diode D. The diode D comprises P+ anode region DP and N+ cathode region DN which are formed by ion implantation into a region isolated by forming a field oxide film (LOCOS) 151 on the surface of the silicon substrate 2. Namely, the diode D can be formed by a semiconductor process comprising forming the field oxide film 151 on the silicon substrate 2, and then patterning the oxide film 151 in the peripheral portion 9 of the silicon substrate 2 to form the regions DP and DN on the surface of the silicon substrate 2. In a thermopile-type infrared detecting element, after the diode D comprising the regions DP and DN is formed, a polysilicon electrical conductor 16 and an aluminum electrical conductor 15, which constitute the thermocouples 14, an oxide film 152, a surface protecting film 153, and an infrared absorber 11 are also formed by using the semiconductor manufacturing process. Therefore, the thermopile-type infrared detecting element provided with the diode can be simply formed by a series of steps of the semiconductor manufacturing technique, decreasing manufacturing cost.

In the infrared detecting element 150, the diode D can be disposed near the cold junctions 18 of the thermopile 12 to permit the accurate detection of the temperature of the cold junctions 18. Also, the space for arranging the thermistor 120 can be reduced to realize an infrared detecting element arranged in a compact unit including the function to measure a reference temperature.

On the other hand, there is always demand for an improvement in the measurement accuracy of the thermopile 12.

In the infrared detecting element 150, the field oxide film 151 has a very low rate of etching with an etchant for etching the silicon substrate, for example, xenon fluoride, potassium hydroxide, or the like, and thus functions as a stopper in etching the central portion 10 of the silicon substrate 2 from the lower side or the back thereof. However, even when the field oxide film 151 has a low etching rate, it is etched, and thus the thickness of the field oxide film 151 must be set to about 5000 to 7000 Å in order to impart the sufficient function as the stopper to the field oxide film 151. On the other hand, the field oxide film 151 comprises a film having internal stress in the compression direction, and thus has the property of being convexly curved due to expansion. The internal stress is as large as 2 to $3 \times 10^9$ dyne/cm$^2$ (1 dyne/cm$^2$=0.1 Pa). Therefore, when the temperature rises, the field oxide film 151 comprising such a thick film as described above is possibly bent due to the internal stress in the compression direction or broken due to deformation.

Furthermore, bending of the field oxide film 151 causes a change in the shapes of the aluminum electrical conductor 15 and the polysilicon electrical conductor 16 of each of the thermocouples 14 formed on the field oxide film 151, and thus the resistances of these electrical conductors are increased compared with the original resistances to cause the occurrence of a useless voltage drop. This influences the measurement accuracy of the temperature difference between the hot junctions 17 and the cold junctions 18, which is measured by the thermopile 12. Therefore, the infrared detecting element 150 has high accuracy because the cold junction temperature can be accurately detected by the diode D. However, in temperature measurement with higher accuracy, measurement error of the thermopile 12 due to deformation of the field oxide film 151 cannot possibly be neglected. Also, the degree of bending of the field oxide film 151 varies with various factors such as variations in the manufacturing process, atmospheric pressure, environmental temperature, etc., and it is thus very difficult to remove the influence of deformation of the field oxide film 151 by correcting the temperature, which is detected by the thermopile 12, using an appropriate factor.

Accordingly, an object of the present invention is to provide an infrared detecting element and a method of manufacturing the same capable of accurately detecting a cold junction temperature by using a PN junction, and capable of removing measurement error of a thermopile due to deformation of a membrane or the like to permit temperature detection with higher accuracy. Another object of the present invention is to provide a temperature measuring device capable of accurately measuring temperature by using the infrared detecting element without being influenced by changes in the measurement environment.

DISCLOSURE OF INVENTION

In the present invention, a first structure layer made of silicon nitride is formed on a semiconductor substrate instead of a field oxide film, and used as element isolation means for forming a PN junction for detecting the temperature of cold junctions as well as a stopper in etching for forming a membrane portion. Namely, a method of manufacturing an infrared detecting element of the present invention comprises the step of forming the first structure layer made of silicon nitride on the semiconductor substrate, the step of patterning the first structure layer in the peripheral portion of the semiconductor substrate to form the PN junction on the surface of the semiconductor substrate, the step of forming a plurality of thermocouples on the first structure layer so that the cold junctions are positioned in the peripheral portion, and the hot junctions are positioned in the central portion of the semiconductor substrate, and then connecting the thermocouples in series to form a thermopile, and the step of etching out the central portion of the semiconductor substrate from below. An infrared detecting element of the present invention comprises a semiconductor substrate having a central portion etched out from below, a first structure layer made of silicon nitride, formed on the semiconductor substrate and having a central portion comprising a membrane structure, a PN junction formed on the surface of the semiconductor substrate by patterning the first structure layer in the peripheral portion of the semiconductor substrate, and a thermopile comprising a plurality of thermocouples formed on the first structure layer and connected in series so that the cold junctions are positioned in the peripheral portion, and the hot junctions are positioned in the central portion of the semiconductor substrate.

The manufacturing method of the present invention comprises forming the first structure layer made of silicon nitride on the semiconductor substrate instead of the field oxide film. When the first structure layer functions as the stopper in etching the central portion of the semiconductor substrate from below, the first structure layer can be thinned because silicon nitride has a lower etching rate than an oxide film (silicon oxide), and thus the membrane structure left after etching can be made thinner than that made of silicon oxide. Therefore, in the infrared detecting element manufactured by the manufacturing method of the present invention, and the infrared detecting element having the construction of the present invention, the membrane portion can be further thinned to decrease an escape of heat. Therefore, the measurement error of the thermopile can be further decreased, and a high-accuracy temperature can be obtained. Furthermore, by further thinning the membrane portion, the heat capacity of the membrane portion can be decreased, and thus the temperature of the hot junctions rapidly increases to permit an increase in the response speed.

On the other hand, by forming the silicon nitride film, the surface of the silicon substrate can be insulated like silicon oxide. Therefore, element isolation for forming the PN junction in the peripheral portion of the semiconductor substrate can be achieved by patterning the first structure layer made of silicon nitride. Thus, by using the manufacturing method of the present invention and the construction of the present invention, the surface of the semiconductor substrate can be isolated by forming the first structure layer made of silicon nitride on the silicon substrate, thereby realizing both the formation of the PN junction for measuring a reference temperature with high accuracy, and an improvement in the accuracy of temperature measurement by the thermopile. Therefore, the measurement accuracy of the infrared detecting element improved in measurement accuracy by forming the PN junction can be further improved. By using the infrared detecting element, it is possible to provide a temperature measuring device capable of accurately measuring temperature without being influenced by the temperature of the measurement environment.

In the manufacturing method of the present invention, the step of forming the first structure layer made of silicon nitride, and the step of patterning the first structure layer to form the PN function are included in the semiconductor manufacturing process, thereby permitting the mass production of the infrared detecting element of the present invention at low cost. Therefore, by using the infrared detecting element of the present invention, it is possible to provide a compact temperature measuring device capable of measuring temperature with high accuracy at low cost.

The manufacturing method of the present invention preferably further comprises the step of forming an infrared absorber on the central portion of the semiconductor substrate so as to cover at least a portion of the thermopile above or near the hot junctions before the step of etching out the central portion of the semiconductor substrate from below. In the infrared detecting element manufactured by the manufacturing method, the infrared absorber absorbs infrared radiation to increase the temperature, thereby increasing the temperature difference between the hot junctions and the cold junctions, and increasing the output voltage of the thermopile. Consequently, the sensitivity of temperature measurement can be increased.

In the step of forming the first structure layer, the first structure layer made of silicon nitride is preferably formed by a low pressure (reduced pressure) CVD process (Low Pressure Chemical Vapor Deposition). The first structure layer of silicon nitride formed by this method comprises a film having internal stress in the tensile direction. Therefore, the first structure layer is liable to contract, and thus produces less distortion and deflection. It is thus possible to further prevent the deformation of the membrane structure, and decrease the error factors in measurement by the thermopile. Therefore, the infrared detecting element and the temperature measuring device capable of measuring temperature with higher accuracy can be provided.

In the step of forming the PN junction for obtaining the reference temperature, a plurality of PN junctions are preferably formed. The plurality of PN junctions are formed, and differences between the forward voltage drops between the PN junctions are determined to cancel the influence of a reverse saturation current on the voltage drops. Thus, the measurement accuracy of the reference temperature can be further improved to provide the infrared detecting element and the temperature measuring device capable of obtaining temperatures with higher accuracy. As the PN junctions, a diode can be used.

The PN junction formed in the peripheral portion of the semiconductor substrate can accurately obtain the reference temperature close to the cold junctions. When a plurality of cold junctions constituting the thermopile are arranged on the four sides of the infrared absorber formed on the central portion of the semiconductor substrate, the PN junction preferably extends along the peripheral portion of the semiconductor substrate because the average temperature of the cold junctions can be obtained by the PN junction to more accurately obtain the temperature of the cold junctions. In forming the long PN junction extending along the peripheral portion, electrodes are preferably respectively formed on the upper surfaces of a first electrical conductor layer and a second electrical conductor layer of the PN junction so as to extend along the first and second electrical conductor layers. These electrodes can decrease the potential difference between the electrical conductor layers having the same polarity to obtain the reference temperature with higher accuracy.

When the first structure layer made of silicon nitride is formed directly on the surface of the semiconductor substrate made of silicon, there is the probability that sufficient adhesion between the first structure layer and the semiconductor substrate cannot be secured. Therefore, a first junction layer made of silicon oxide is preferably formed on the semiconductor substrate to improve the adhesion between the semiconductor substrate and the first structure layer before the first structure layer is formed on the semiconductor substrate. Since the first junction layer is formed for junction, the first junction layer is not required to have the stopper function, and can thus be made thinner than the first structure layer. Therefore, even if the junction layer has internal stress in the compression direction, the internal stress can be minimized. The first structure layer made of silicon nitride formed by low-pressure CVD generally has strong internal stress in the tensile direction, and thus the cause of deflection can be removed.

Since the first structure layer made of silicon nitride formed by low-pressure CVD generally has strong internal stress in the tensile direction, the first structure layer is possibly separated when a film having a sufficient thickness is deposited in order to remove bending of the membrane portion. Therefore, the manufacturing method of the present invention may further comprise the step of forming a second structure layer made of silicon oxide on the first structure layer, and the step of forming a third structure layer made of silicon nitride on the second structure layer. In the infrared detecting element comprising the second structure layer made of silicon oxide and the third structure layer made of silicon nitride, both of which are formed on the first structure layer, a film having a sufficient thickness for removing bending of the membrane portion can be divided into the first structure layer and the third structure layer. Therefore, even when the film thickness is set to prevent separation of the first and third structure layers, stress in the tensile direction can be easily attained in the whole membrane portion.

Although the central portion of the semiconductor substrate is etched out to form the membrane structure after the first structure layer made of silicon nitride is formed, a surface protecting film is preferably formed on the semiconductor substrate before the etching step to avoid the influence of the etchant on a metal layer constituting the thermopile.

As the semiconductor substrate, a P-conduction type silicon substrate may be used, but an N-conduction type is preferred. When a diode is formed on the P-conduction type silicon substrate, an N inversion layer is formed below an insulating layer provided on the surface of the silicon substrate, and a reverse current flows through the N inversion layer to deteriorate the forward characteristics of the diode. On the other hand, with the N-type silicon substrate, the N inversion layer is not formed to obtain the good forward characteristics of the diode, thereby permitting accurate temperature measurement.

In this way, by using the infrared detecting element of the present invention, the temperature measuring device capable of temperature measurement with high precision can be provided. Therefore, the temperature measuring device using the infrared detecting element of the present invention is suitable for a thermometer required to perform measurement of body temperatures with high accuracy. For example, in a clinical ear thermometer, a cylindrical portion having a distal tip, which can be inserted in an ear cavity, is provided, and the infrared detecting element is arranged so that the upper portion of the central portion faces the distal tip of the cylindrical portion, providing a clinical thermometer capable of always accurately measuring body temperatures. By using the infrared detecting element comprising the infrared absorber laminated on the central portion, a clinical thermometer having high sensitivity of temperature measurement can be provided.

BEST MODE FOR CARRYING OUT THE INVENTION

Figure 1:
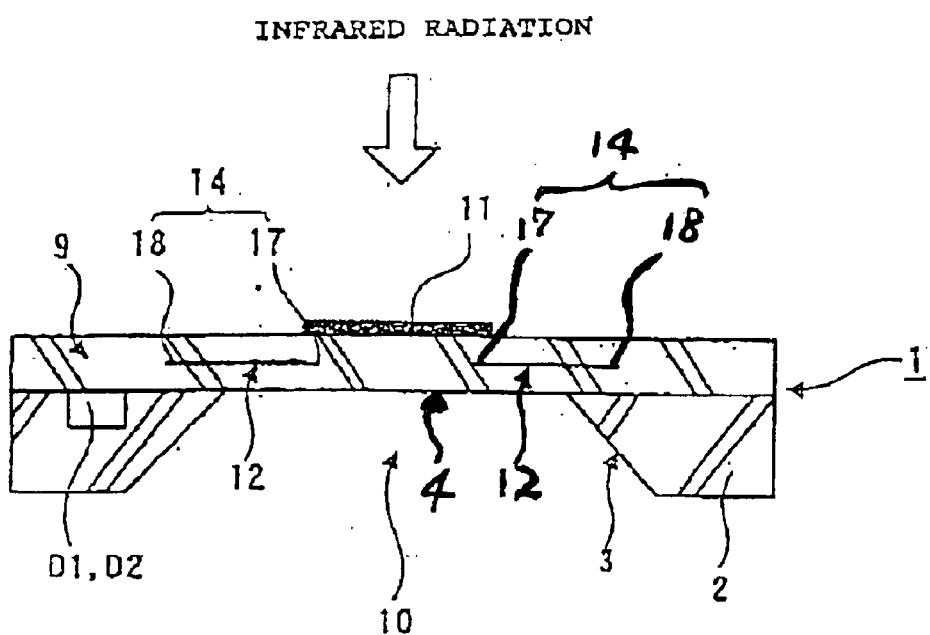
FIG. 1 is a drawing showing the schematic construction of an infrared detecting element according to an embodiment of the present invention.

The present invention is described in further detail below with reference to the drawings. FIG. 1 shows the schematic construction of an infrared detecting element.

An infrared detecting element 1 of an embodiment comprises a silicon substrate 2 having a structure in which a central portion 10 is removed by etching from below to leave a membrane as a membrane portion 4 in the central portion 10, and an unetched portion as a thick wall portion 3 after etching of the silicon substrate 2. Also, gold black is deposited in a substantially square shape on the upper surface of the membrane portion 4 by sputtering vapor deposition or the like to form an infrared absorber 11.

The infrared detecting element 1 comprises a plurality of thermocouples 14 arranged on the four sides of the infrared absorber 11. The hot junction 17 of each of the thermocouples 14 is arranged below the infrared absorber 11 of the membrane portion 4, and the cold junction 18 of each of the thermocouples 14 is arranged in the thick wall portion 3. The thermocouples 14 are connected in series to form a thermopile 12. In the infrared detecting element 1 of this embodiment, diodes D1 and D2 are formed in the peripheral portion 9 of the silicon substrate 2, i.e., in the thick wall portion 3, for detecting the temperature of the cold junctions 18 of the thermopile 12.

Figure 2:
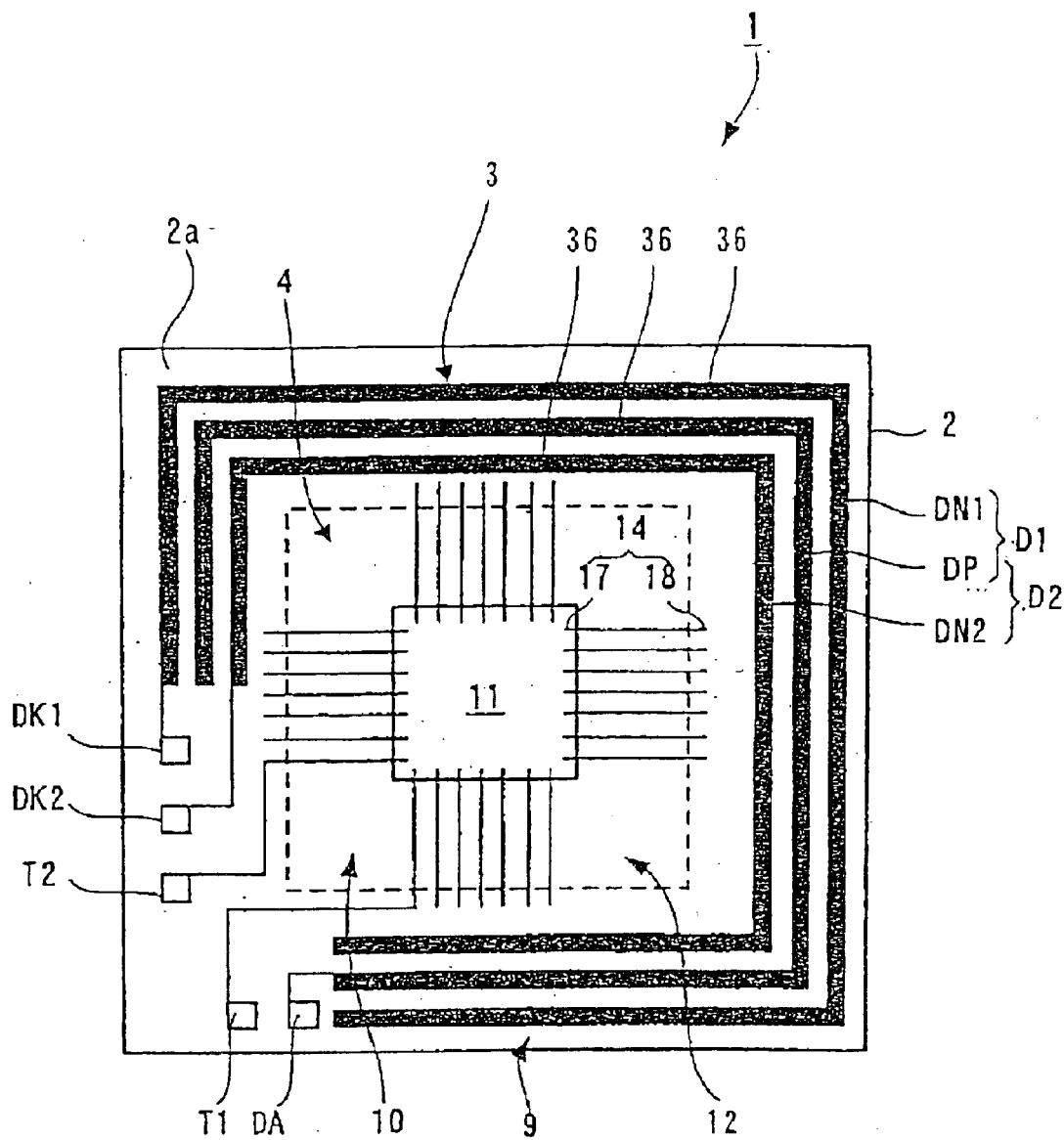
FIG. 2 is a drawing showing the surface-side construction of the infrared detecting element according to the embodiment of the present invention.

FIG. 2 is a drawing showing the surface-side construction of the infrared detecting element 1. Although this figure is a plan view showing a structure formed on the upper surface 2a of the silicon substrate 2, the structure actually comprises several different layers. As described above, the infrared absorber 11 is formed in a substantially square shape at the center of the membrane portion 4 positioned at the center of the upper surface 2a of the silicon substrate 2, and the plurality of thermocouples 14 are arranged on the four sides of the infrared absorber 11. The plurality of thermocouples 14 are connected in series to form the thermopile 12 so that the output voltage of the thermopile 12 can be obtained from terminals T1 and T2.

Figure 3:
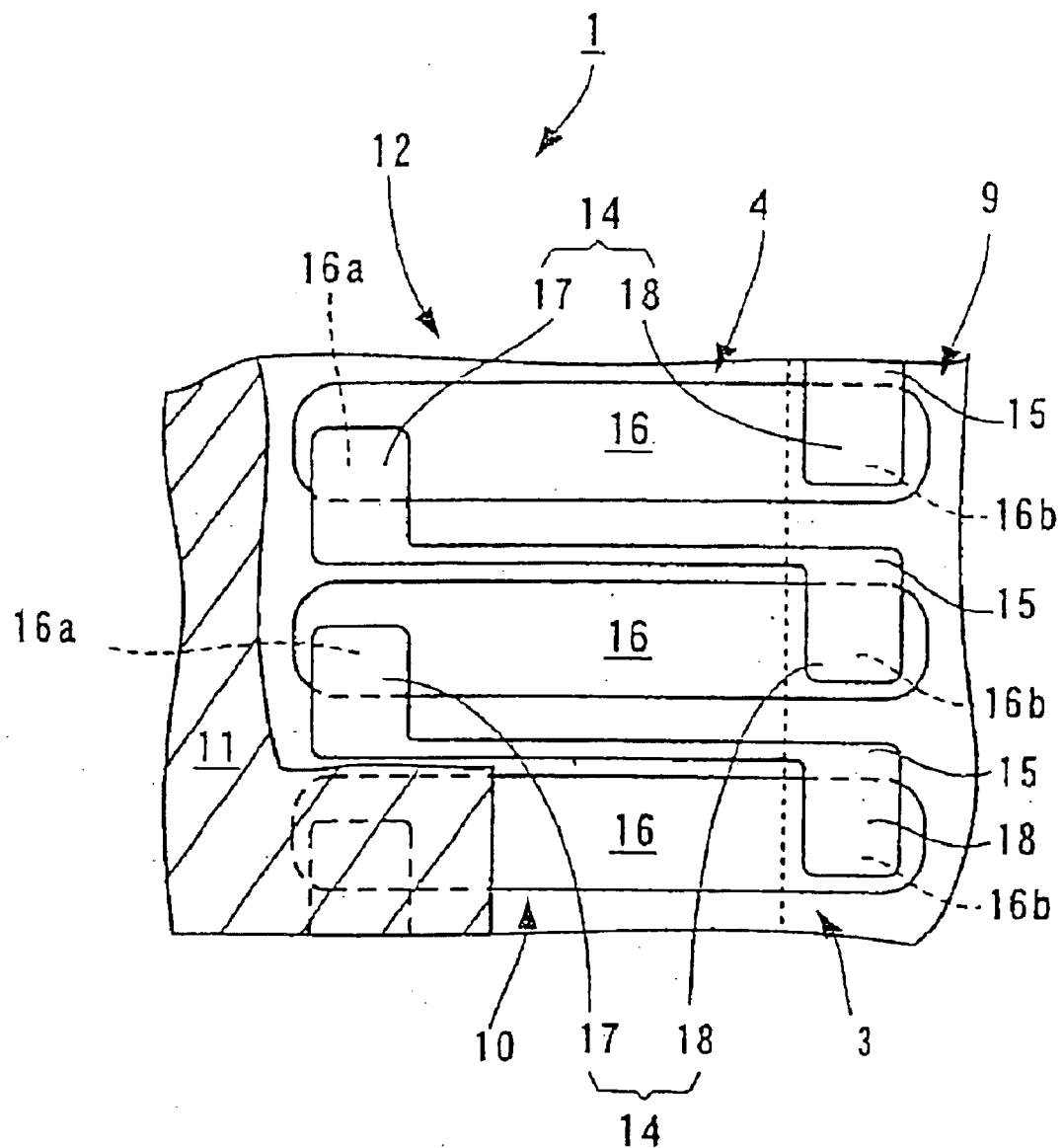
FIG. 3 is a drawing illustrating a thermopile of the infrared detecting element according to the embodiment of the present invention.

FIG. 3 is a drawing illustrating the thermopile 12, and also an enlarged view showing the construction of the thermocouples 14. Each of the thermocouples 14 comprises two types of electrical conductors including an aluminum (Al) electrical conductor 15 and a polysilicon (Poly-Si) electrical conductor 16. The polysilicon electrical conductors 16 are linearly formed to slightly overlap the infrared absorber 11 and extend to the four sides. Also, the infrared absorber 11 side end 16a of one of the adjacent polysilicon electrical conductors 16 is electrically connected to the thick wall portion 3 side end 16b of the other polysilicon electrical conductor 16 by the aluminum electrical conductor 15. This can form the thermocouples 14 each having the hot junction 17 on the infrared absorber 11 side and the cold junction 18 serving as a heat sink on the thick wall portion 3 side, and the thermocouples 14 are connected in series to form one thermopile 12.

Again referring to FIG. 2, the two diodes D1 and D2 are formed in the peripheral portion 9 serving as the thick wall portion 3 of the silicon substrate 2. The diodes D1 and D2 are formed in stripes extending along the peripheral portion 9 of the silicon substrate 2 to surround the four sides of the membrane portion 4 positioned at the center of the substrate 2. The diodes are also formed to surround the cold junctions 18 of the thermocouples 14 so that the average temperature of the thick wall portion 3 where the plurality of cold junctions 18 are positioned is reflected in output of the diodes D1 and D2. The diode D1 comprises a fist electrical conductor layer DP formed to surround the cold junctions 18, and a second electrical conductor layer DN1 formed in parallel with the region DP outside the outer periphery of the first electrical conductor layer DP. On the other hand, the diode D2 comprises the first electrical conductor layer DP and a second electrical conductor layer DN2 formed in parallel with the region DP inside the inner periphery of the first electrical conductor layer DP.

The first electrical conductor layer DP is a P+ diffusion layer doped with an acceptor impurity by ion implantation of boron (B) into the silicon substrate 2, and functions as an anode of the diodes. While the second electrical conductor layers DN1 and DN2 are n+ diffusion layers doped with a donor impurity by ion implantation of phosphorus (P) into the silicon substrate 2, and function as cathodes of the diodes. Outputs of the two diodes D1 and D2 comprising the common anode are connected to an anode terminal DA and cathode terminals DK1 and DK2 formed in the thick wall portion 9. Therefore, when a predetermined current is supplied to each of the diodes D1 and D2, forward voltage drops of the diodes D1 and D2 can be measured, and the reference temperature can be accurately determined by the difference between the voltage drops.

Although the temperature of the cold junctions of the thermopile 12 can be detected by either of the diodes, the reference temperature, i.e., the temperature of the cold junctions, can be determined with higher accuracy by using the difference between the forward voltage drops. Namely, forward current IF and forward voltage (or forward voltage drop) VF of a diode have the following relationship:

$$IF=IS(\exp(qVF/KT)-1) \quad \text{[Equation 1]}$$

In equation 1;
IF: forward current [A]
IS: reverse saturation current [A]
T: absolute temperature [°K]
VF: forward voltage [V]
K: Boltzmann's constant ($1.3804 \times 10^{-23}$ [JK$^{-1}$])
q: electric charge ($1.602 \times 10^{-19}$ [C])

Equation 1 can be changed to equation 2 by solving for VF.

$$VF=(KT/q)\log(IF/IS) \quad \text{[Equation 2]}$$

As can be seen from equation 2, the temperature of the cold junctions 18 can be determined based on the forward voltage drop VF of the diode D1 or D2. However, in order to determine the temperature of the cold junctions 18 from the forward voltage drop VF of one of the diodes, the forward current IF and the reverse saturation current IS must be determined. It is relatively difficult to directly determine these current values, and thus a conceivable realistic method is used, in which the relationship between temperature and voltage is previously measured and stored by a table, and the temperature is determined based on the detected forward voltage VF.

However, the difference ΔVF between forward voltage drops VF is determined according to the following equation 3:

$$\Delta VF = (KT/q)\log(IF1/IS1) - (KT/q)\log(IF2/IS2) \quad \text{[Equation 3]}$$
$$= (KT/q)[\log(IF1/IS1) - \log(IF2/IS2)]$$
$$= (KT/q)[\log(IF1/IF2) - \log(IS1/IS2)]$$

Furthermore, when the two diodes having the same impurity concentration are formed in the same semiconductor substrate by the same production method, the reverse saturation currents IS may be considered as substantially the same, and thus the term of the reverse saturation currents IS can be omitted. Therefore, equation 3 can be changed to the following equation 4:

$$\Delta VF=(KT/q)\log(IF1/IF2) \quad \text{[Equation 4]}$$

Also, the forward current IF is represented by the ratio of the forward currents flowing through the two diodes D1 and D2, and thus the current values need not be determined. Therefore, in the infrared detecting element 1, assuming that the forward voltages of the diodes D1 and D2 are VF1 and VF2, respectively, the temperature coefficient of the difference ΔVF is determined according to the following equation 5:

$$\Delta VF/T=(K/q)\log(IF1/IF2) \quad (5)$$

In this way, when the diodes D1 and D2 are provided to utilize the difference between the forward voltage drops of these diodes, the temperature of the thick wall portion 3 provided with the diodes D1 and D2, i.e., the temperature of the cold junctions 18, can be accurately determined.

Therefore, the difference between the potential difference between the anode terminal DA and the cathode terminal DK1, and the potential difference between the anode terminal DA and the cathode terminal DK2 is determined and connected to a circuit capable of amplification and calculation to permit the accurate determination of the reference temperature. Therefore, the temperature difference determined by the output from the thermopile 12 is corrected to permit temperature measurement with high accuracy. The terminals for connecting the infrared detecting element 1 of this embodiment to the circuit having the above function are collected at a corner of the thick wall portion 3, and thus outputs of all the thermopile 12, and the diodes D1 and D2 can easily be taken out to the outside.

Figure 4:
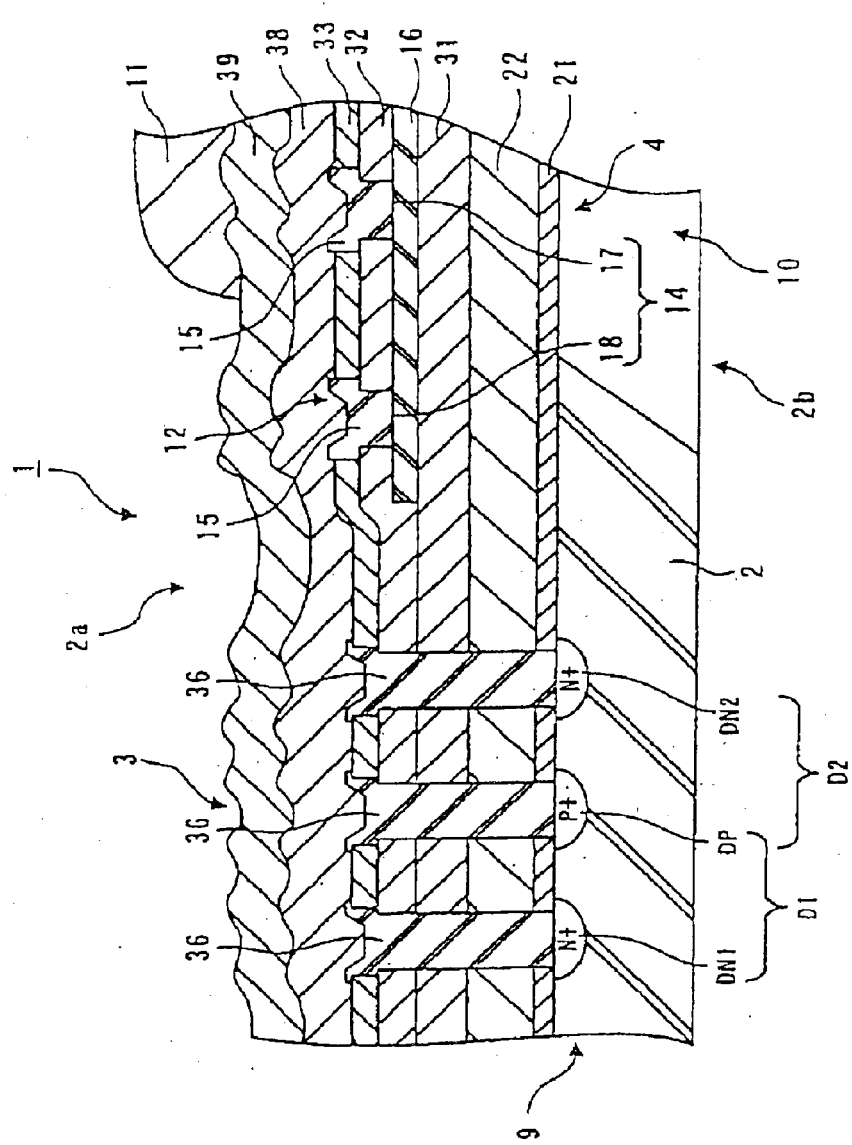
FIG. 4 is a cross-sectional view illustrating the detailed construction of the infrared detecting element according to the embodiment of the present invention.

FIG. 4 is a cross-sectional view showing a structure laminated on the upper surface 2a of the semiconductor substrate 2. In the infrared detecting element 1, a first junction layer 21 made of silicon oxide, a first structure layer 22 made of silicon nitride, an oxide film 31 serving as a junction layer, an electrical conductor 16 made of polysilicon and constituting each of the thermocouples 14, two silicon oxide films 32 and 33, and two surface protecting films 38 and 39 are laminated on the silicon substrate 2 in turn from below. The infrared absorber 11 is deposited on the surface protecting films. The central portion of the semiconductor substrate 2 is etched out of a lower portion 2b to form the membrane portion 4 in the central portion 10.

Of these layers, the first structure layer 22 made of silicon nitride comprises a film deposited by the low pressure (reduced pressure) CVD process. The silicon nitride film deposited by the low pressure (reduced pressure) CVD process has a stress of about 8 to $10 \times 10^9$ dyne/cm$^2$ (1 dyne/cm$^2$=0.1 Pa) at a certain temperature. Therefore, the first structure layer 22 made of the silicon nitride deposited by the low pressure (reduced pressure) CVD process is liable to be pulled by the thick wall portion 3 serving as a base to cause less bending of the membrane portion 4 supported by the first structure layer 22.

Also, silicon nitride has a lower rate of silicon etching with an etchant such as xenon fluoride, potassium hydroxide, or the like than silicon oxide. Therefore, silicon nitride is more efficient than silicon oxide as an etching stopper, and can securely prevent corrosion even when the film thickness is small. Therefore, etching for forming the central portion 10 comprising the first structure layer 22 can be securely controlled.

Figure 27:
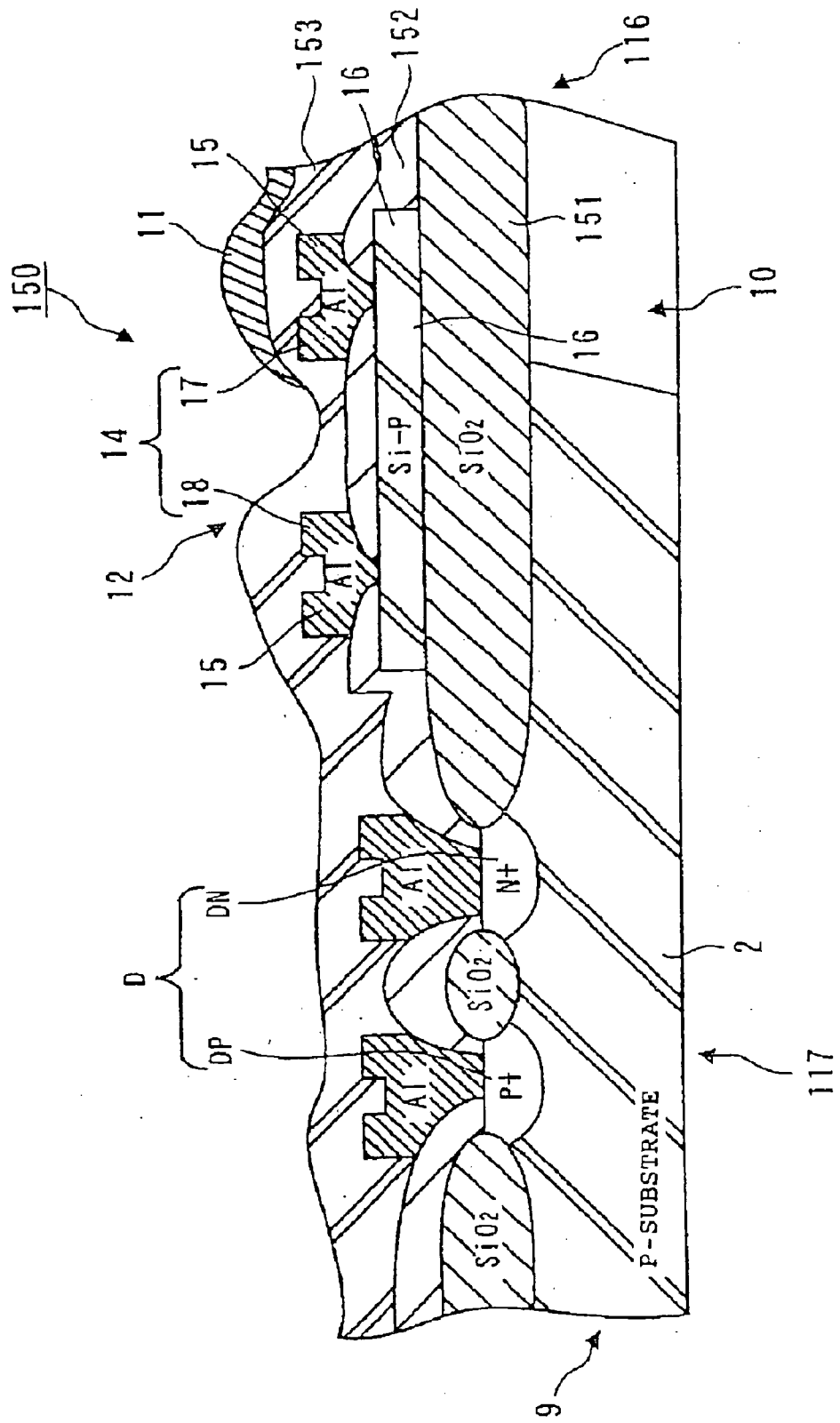
FIG. 27 is a cross-sectional view illustrating the construction of an infrared detecting element conventionally proposed by the applicant of the present invention.

Furthermore, like silicon oxide, silicon nitride has an insulating property, and can thus insulate elements from each other when being formed on the surface of the silicon substrate. In the infrared detecting element 1 of this embodiment, the first structure layer 22 extending in the peripheral portion 9 of the silicon substrate 2 is patterned to serve as a film for isolating the regions DN1, ND2 and DP from each other, which constitute the diodes D1 and D2. Therefore, in the infrared detecting element 1 of this embodiment, as described above, forming the first structure layer 22 made of silicon nitride over the upper surface 2a of the silicon substrate 2 can achieve element isolation for forming the diodes, and form a sufficiently thin membrane which is not bent. Consequently, the membrane portion can be thinned to prevent escape of heat, and deformation such as bending or the like can be prevented without an increase in complexity of the manufacturing process, as compared with the infrared detecting element shown in FIG. 27 in which element isolation and a membrane portion are achieved by using an oxide film. It is thus possible to provide the infrared detecting element having higher sensitivity and accuracy.

The first junction layer 21 made of silicon oxide and formed below the first structure layer 22 is a layer for securing adhesion between the first structure layer 22 made of silicon nitride and the silicon substrate 2. Also, in the central portion 10, the polysilicon electrical conductor 16 is formed on the first structure layer 22 through the oxide film 31 functioning as the etching stopper, and the aluminum electrical conductor 15 is formed on the polysilicon electrical conductor 16 to form the thermocouples 14. On the other hand, in the peripheral portion 9, the conductive regions DN1, DN2 and DP, which constitute the diodes D1 and D2, are formed on the silicon substrate 2 to be isolated from each other by the first structure layer 22, and aluminum wiring 36 is formed on these regions.

Furthermore, the oxide film 32 serving as an insulating layer, and the oxide film 33 for planarization are laminated to cover the central portion 10 and the peripheral portion 9, and the silicon oxide surface protecting film 38 and the silicon nitride surface protecting film 39 are laminated on these oxide films 32 and 33. In the central portion 10, the infrared absorber 11 is formed on the uppermost layer so as to cover the portions above the hot junctions 17 of the thermopile 12. The infrared absorber 11 absorbs infrared radiation to increase the temperature, thereby securing a large temperature difference between the hot junctions 17 and the cold junctions 18. As a result, the output voltage of the thermopile 12 is increased to increase the sensitivity of temperature measurement.

Figure 5:
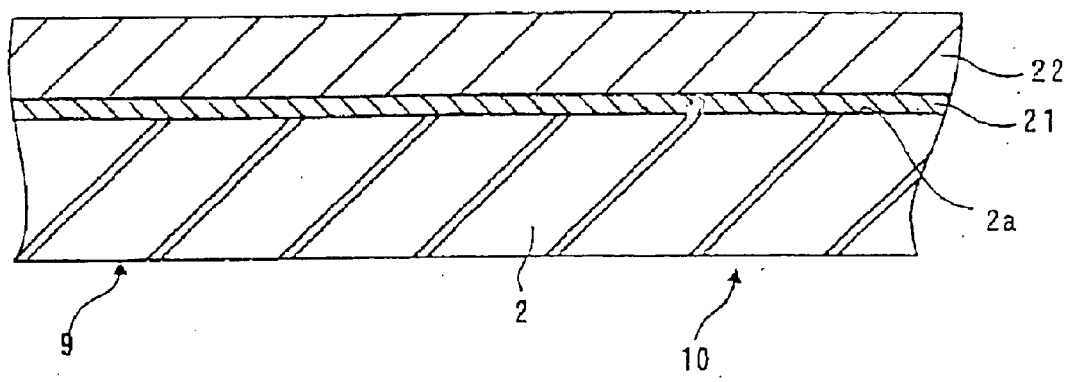
FIG. 5 is a drawing showing the step of forming a first structure layer on a silicon substrate in a process for manufacturing the infrared detecting element according to the embodiment of the present invention.
Figure 6:
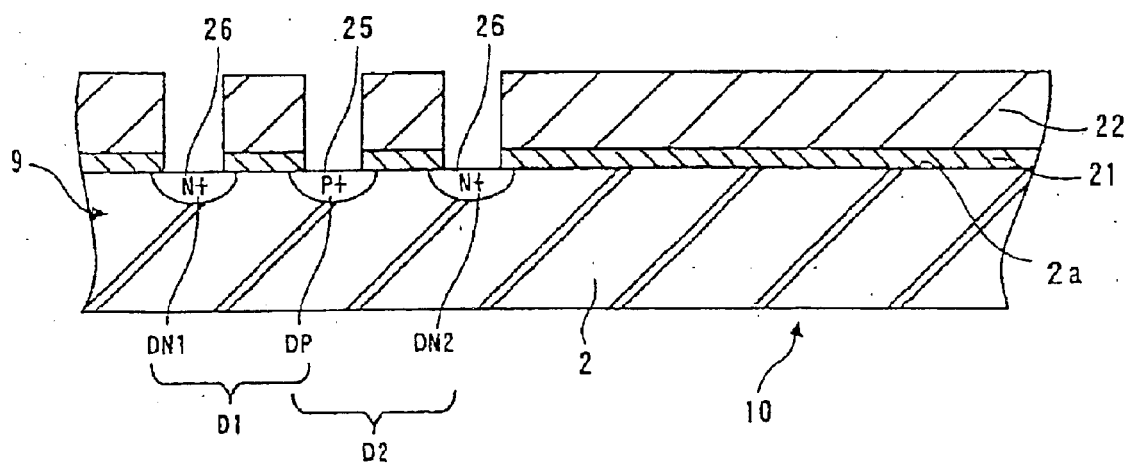
FIG. 6 is a drawing showing the step of forming a diode after the step shown in FIG. 5.

FIGS. 5 to 12 schematically show the process for manufacturing the infrared detecting element 1 of this embodiment. As shown in FIG. 5, the first junction layer 21 made of silicon oxide (SiO$_2$) having a thickness of as small as about 400 Å is formed on the upper surface 2a of the p-type silicon substrate 2 by thermal oxidation. The first junction layer 21 comprises a film for increasing adhesion to the first structure layer 22 formed thereon, the film being thinner than a field oxide film deposited as a film for element isolation in a general semiconductor manufacturing process. As described above, the first junction layer 21 is made of silicon oxide, has internal stress in the compression direction, and is liable to be bent with a small thickness. However, since the first junction layer 21 is thin, and as described above, the first structure layer 22 made of silicon nitride having internal stress in the tensile direction is laminated on the first junction layer 21, the internal stress in the compression direction of the first junction layer 21 causes substantially no influence on bending.

Next, the first structure layer 22 made of silicon nitride (Si$_3$N$_4$) and having a thickness of about 2500 Å is formed on the upper surface of the first junction layer 21 by the low pressure CVD process. The first structure layer 22 comprises a film having internal stress in the tensile direction, and can prevent bending when being formed in a thin film. In the infrared detecting element having the construction shown in FIG. 27, the field oxide film has a thickness of about 5000 to 7000 Å in order to impart the sufficient function as a stopper to the oxide film. However, the first structure layer made of silicon nitride having a low etching rate is formed to decrease the thickness to about ⅓. Since the first structure layer 22 made of silicon nitride serves as the stopper, the first junction layer 21 formed below the first structure layer 22 need not be expected to function as the stopper, thereby decreasing the thickness.

Next, a photoresist is applied onto the first structure layer 22, and exposed and developed, and then the first structure layer 22 and the first junction layer 21 are patterned by etching using the photoresist (not shown in the drawing) as a mask. Then, the diodes D1 and D2 are formed in the regions of the peripheral portion 9 of the silicon substrate 2, which are designed to form the diodes D1 and D2, by using the first structure layer 22 for the isolation region. Therefore, boron (B) ion is implanted into the region 25, where the first electrical conductor layer DP is formed, with a high voltage of 35 KeV for acceleration to form the P+ diffusion layer (first electrical conductor layer) DP having an impurity concentration of $4 \times 10^{15}$ ion/cm$^2$. Also, phosphorus (P) ion is implanted into the regions 26, where the second electrical conductor layers DN1 and DN2 are formed, with a high voltage of 80 KeV for acceleration to form the N+ diffusion layers (second electrical conductor layers) DN1 and DN2 having an impurity concentration of $4 \times 10^{15}$ ion/cm$^2$. After each of the electrical conductor layers is formed, annealing is performed under conditions of 900° C. and 20 mm in order to recover the crystal defects produced in ion implantation and activate the impurities implanted into the regions 25 and 26. Consequently, the diodes D1 and D2 isolated from each other by the first structure layer 22 are formed.

Figure 7:
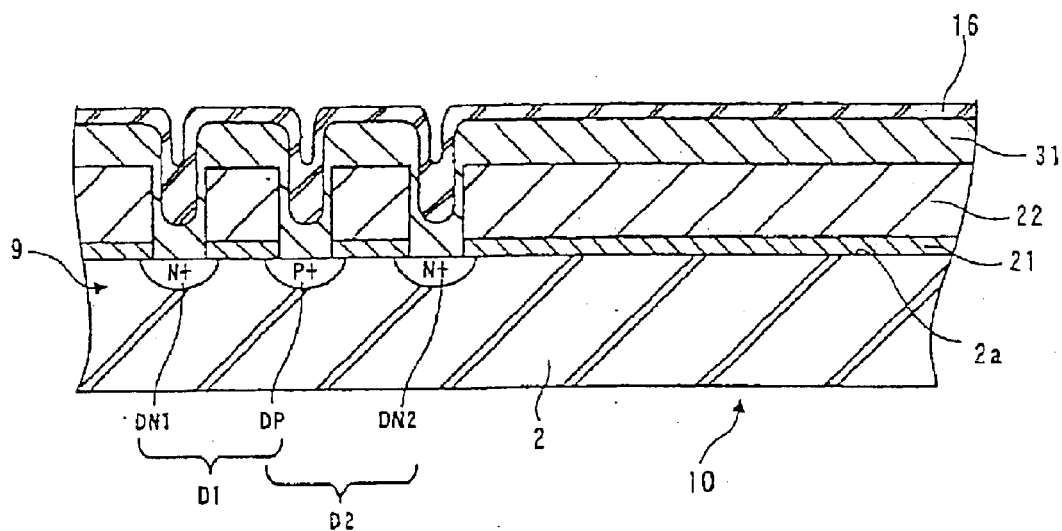
FIG. 7 is a drawing showing the step of forming an oxide film and an electrical conductor made of polysilicon on the first structure layer after the step shown in FIG. 6.

Next, as shown in FIG. 7, the oxide film (HTO: High Temperature Oxide) 31 having a thickness of about 1000 Å is formed by the high-temperature CVD process. The thus-deposited oxide film 31 comprises a hard film having a low impurity diffusion coefficient. Depositing the oxide film 31 can prevent impurity diffusion from the metal layers laminated on the oxide film 31, i.e., the polysilicon electrical conductor 16 and the aluminum electrical conductor 15, which constitute the thermocouples 14, to the silicon substrate 2.

Then, the polysilicon electrical conductor 16 constituting one of the electrical conductors of each of the thermocouples 14 is formed on the oxide film 31. Therefore, the polysilicon electrical conductor 16 having a thickness of about 4000 Å is formed by the CVD process using a silane ($SiH_4$) gas. The reaction formula is $SiH_4 \rightarrow Si+H_2$. The polysilicon electrical conductor 16 is doped with, for example, phosphorus as a donor impurity, followed by thermal diffusion to achieve a sheet resistance of 15 ohm/sq.

Figure 8:
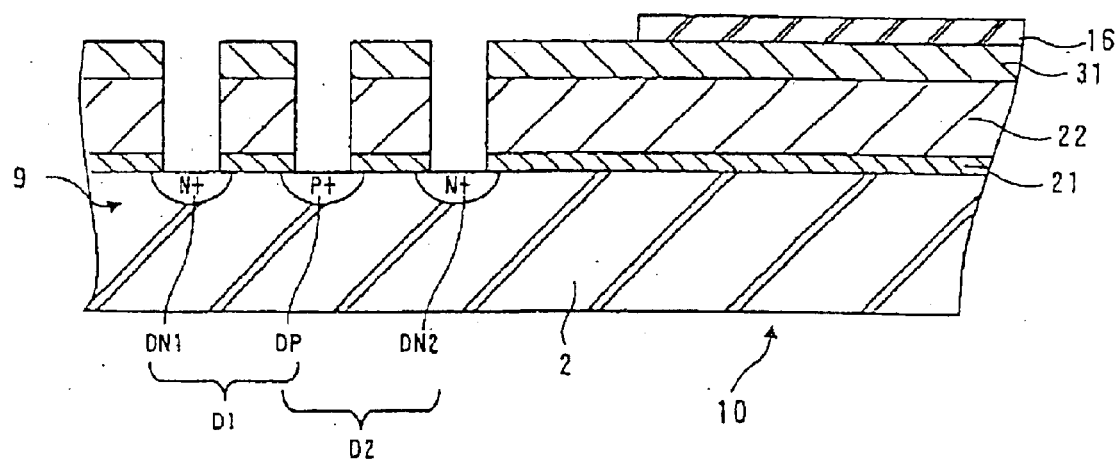
FIG. 8 is a drawing showing the step of patterning the electrical conductor made of polysilicon after the step shown in FIG. 7.

Then, a photoresist not shown in the drawing is applied onto the polysilicon electrical conductor 16, and exposed and developed, and the polysilicon electrical conductor 16 is then patterned by etching using the photoresist as a mask to expose the diffusion layers DP, DN1 and DN2, as shown in FIG. 8.

Figure 9:
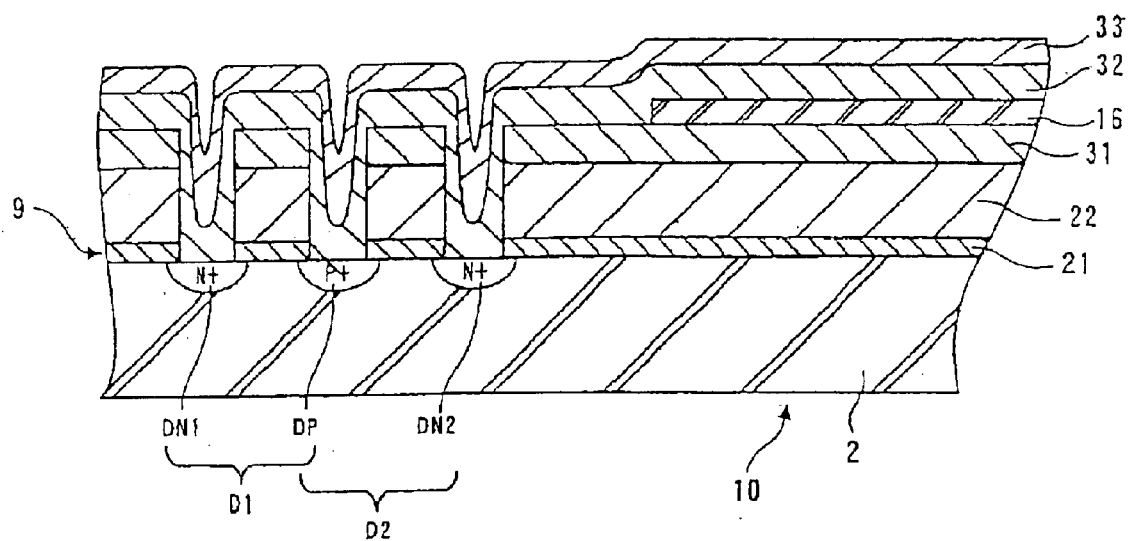
FIG. 9 is a drawing showing the step of forming two oxide films on the electrical conductor made of polysilicon after the step shown in FIG. 8.

Next, as shown in FIG. 9, the oxide film (HTO) 32 having a thickness of about 1000 Å is again deposited by the CVD process, and the oxide film (BPSG) 33 having a thickness of about 8000 Å is further deposited on the oxide film 32 by the CVD process. The oxide film 33 comprises LTO (Low Temperature Oxide), and viscosity is imparted to the oxide film itself to form a state which can easily be planarized. Therefore, after the oxide film 33 is formed, the oxide film 33 is planarized by annealing under conditions of 900° C. and 20 min. During annealing, boron and phosphorus easily diffuse in the films, but the oxide film 32 comprising HTO is formed below the oxide film 33, thereby blocking diffusion of born and phosphorus to the silicon substrate side by the film 32.

Figure 10:
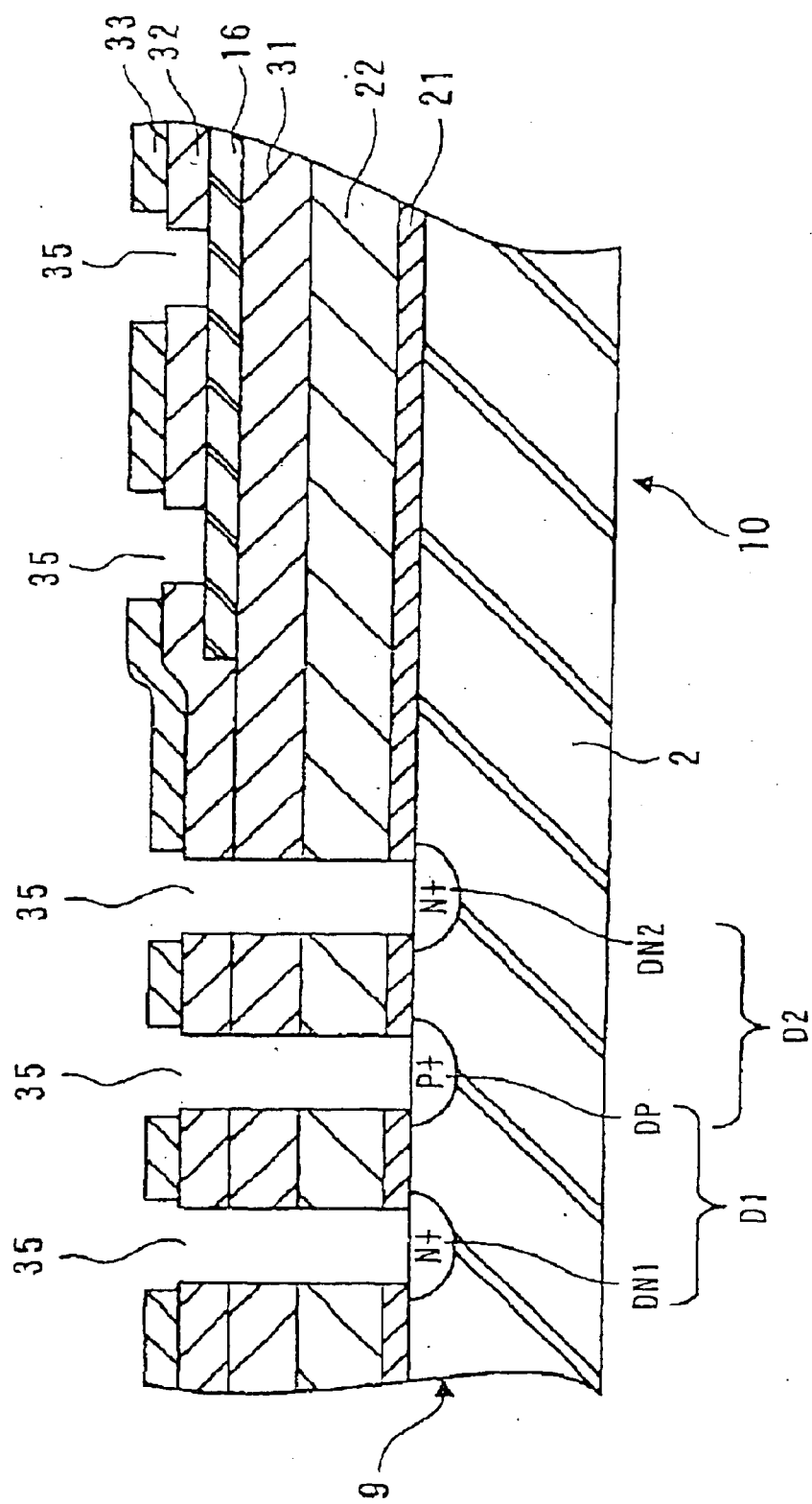
FIG. 10 is a drawing showing the step of patterning the two oxide films formed on the electrical conductor made of polysilicon after the step shown in FIG. 9.

After the surface of the deposited film is planarized to form a state in which an aluminum metal film can be formed without disconnection as described above, patterning 35 is performed for conduction between the diffusion layers DP, DN1 and DN2, and the polysilicon electrical conductor 16, which are formed on the silicon substrate 2, and a metal (aluminum metal), as shown in FIG. 10. Namely, a photoresist (not shown in the drawing) is applied onto the oxide film 33, and exposed and developed, and then the oxide films 33 and 32 are etched by using the photoresist as a mask to expose the diffusion layers DP, DN1 and DN2, and the portions corresponding to the hot junctions 17 and the cold junctions 18 of the polysilicon electrical conductor 16.

Figure 11:
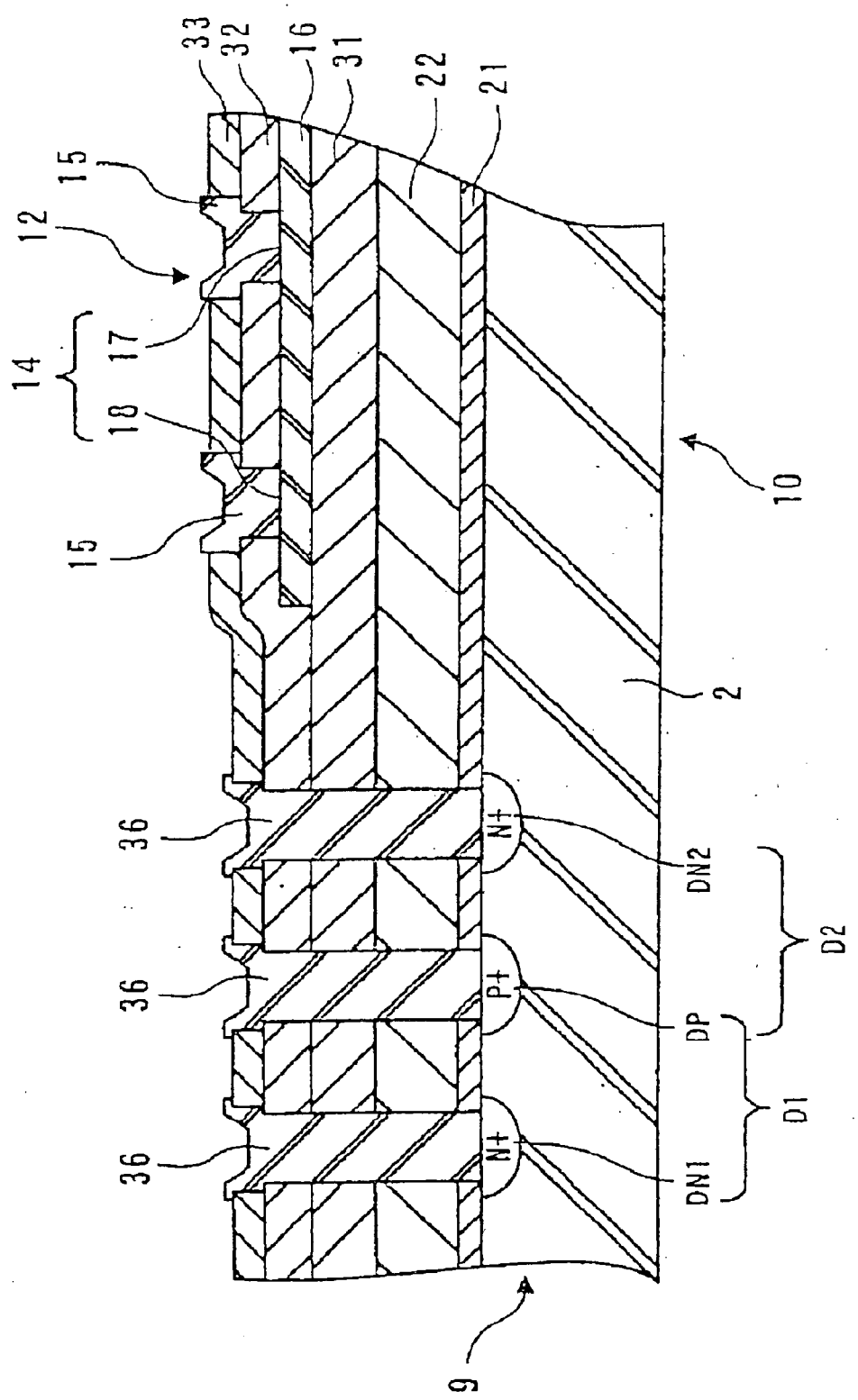
FIG. 11 is a drawing showing the step of forming a thermopile after the step shown in FIG. 10.

Next, aluminum is deposited by sputtering vapor deposition so as to fill in the recesses formed by patterning and form an aluminum film not shown in the drawing on the oxide film 33. Then, a photoresist is applied onto the aluminum film, and exposed and developed, and the aluminum film is patterned by etching using the photoresist as a mask to form the metal wiring 36 and the aluminum electrical conductor 15, as shown in FIG. 11. As a result, the aluminum electrical conductor 15 is connected to the polysilicon electrical conductor 16 to form the hot junctions 17 and the cold junctions 18. At the same time, the plurality of thermocouples 14 are connected in series to form the thermopile 12. Since the oxide film (BPSG) 33 is deposited on the oxide film 32, and planarized, disconnection of the aluminum electrical conductor 15 and the metal wiring 36 can be prevented during etching.

Figure 12:
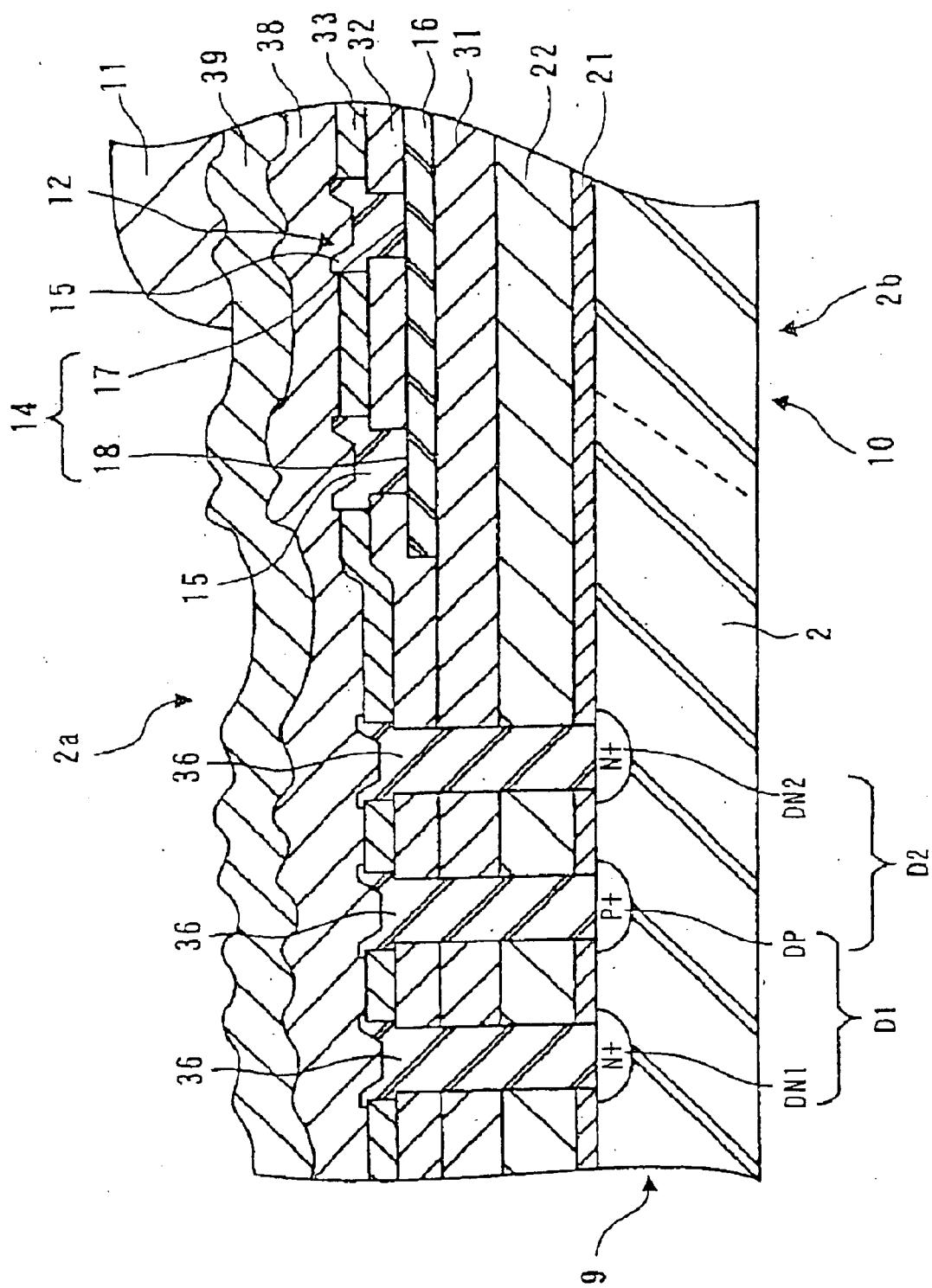
FIG. 12 is a drawing showing the step of forming two surface protecting films and an infrared absorber after the step shown in FIG. 11.

In this way, the structure laminated on the upper surface 2a of the semiconductor substrate 2 is substantially completed. Then, as shown in FIG. 12, the surface protecting film (PADA) 38 having a thickness of about 2000 Å is deposited by the plasma CVD process using a TEOS (tetraethyl orthosilicate) gas. After the film 38 is deposited, SOG (Spin On Glass) is applied and then baked under conditions of 400° C. and 30 min. As a result, the surface protecting film 38 is planarized.

In this embodiment, a plasma nitride film (SixNy) is deposited as the second surface protecting film (PADB) 39 having a thickness of about 1000 Å on the first surface protecting film 38 by a plasma enhanced CVD process. The combination of the thicknesses of the two surface protecting films 38 and 39 is not limited to the above, and the thickness of the surface protecting film 38 may be 2000, 20000 or 6000 Å, and the thickness of the surface protecting film 39 may be 10000, 5000 or 10000 Å according to the thickness of the surface protecting film 38. Alternatively, the surface protecting film 38 having a thickness of 30000 Å may be deposited to omit the surface protecting film 39. The above-described thicknesses of the other layers are only examples, and the thicknesses are not limited to the above values.

The surface protecting films are films for preventing etching of the structure layers such as the aluminum electrical conductor 15 and the polysilicon electrical conductor 16, and the like, which are formed on the upper surface 2a of the silicon substrate 2, during final etching of the silicon substrate 2. Therefore, with the surface protecting film 39 having an excessively small thickness, the surface protecting film 39 is not properly formed on an uneven portion to cause entrance of the etchant, thereby possibly breaking the thermopile 12 due to etching of the surface protecting film 38. Therefore, the thicknesses of the two films 38 and 39 are preferably appropriately set according to the etching rate.

Furthermore, gold black is deposited on the surface protecting film 39 to form the infrared absorber 11 having a thickness of about 1 to 10 μm. Finally, the lower portion 2b of the silicon substrate 2 is masked to leave the central portion 10, and the central portion 10 of the silicon substrate 2 is anisotropically etched with KOH or NaOH as the etchant from below. Consequently, the central portion 10 of the silicon substrate 2 is removed to form the infrared detecting element 1 shown in FIG. 4. During etching, the first structure layer 22 functions as the stopper to prevent excessive etching. Therefore, the central portion 10 of the silicon substrate 2 can be substantially completely removed to form the membrane portion 4 having a desired thickness in the central portion 10.

The infrared detecting element 1 of this embodiment can be manufactured by the above-described manufacturing method. The infrared detecting element 1 of this embodiment comprises the first structure layer 22 made of silicon nitride instead of silicon oxide and formed on the silicon substrate 2. Particularly, in the infrared detecting element 1 of this embodiment, the first structure layer 22 is formed by the low pressure CVD process, and thus the first structure layer 22 comprises a film having strong internal stress in the tensile direction. Therefore, the membrane portion is less likely to be bent, and measurement error of the thermopile 12 due to deformation of the membrane portion 4 can be decreased.

Furthermore, the first structure layer 22 made of silicon nitride is caused to function as the stopper during etching. Therefore, the first structure layer 22 functioning as the stopper can be made thinner than a structure in which the field oxide film serves as the stopper, thereby decreasing the heat capacity of the membrane portion 4. Thus, the temperature of the hot junctions 17 rapidly increases to increase the response speed. By thinning the second structure layer 22, the escape of heat from the hot junctions 17 to the cold junction 18 can be decreased. Therefore, measurement error of the thermopile 12 can be further decreased to obtain a temperature with higher accuracy.

Figure 13:
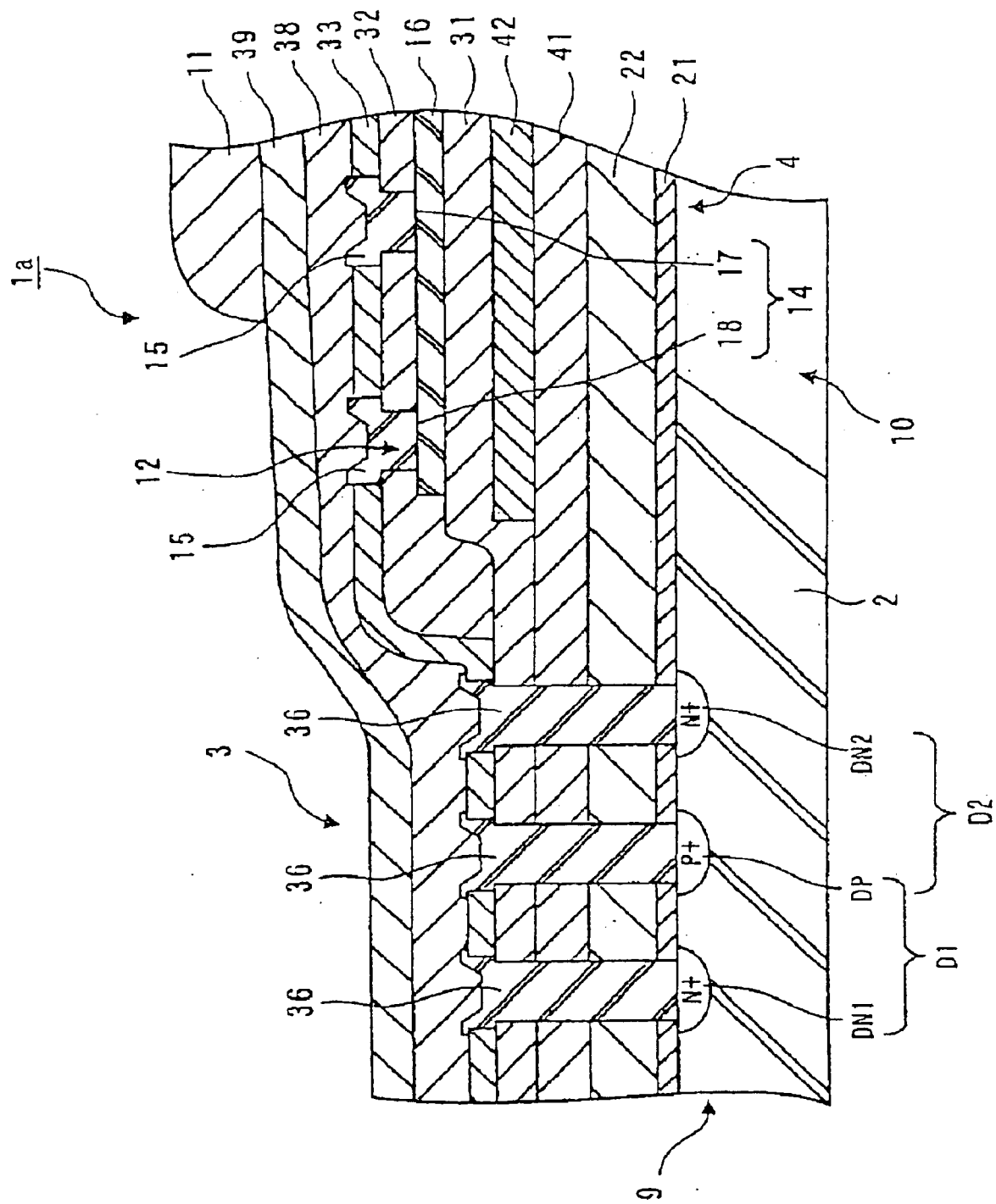
FIG. 13 is a cross-sectional view showing another example of an infrared detecting element.

Furthermore, the structure layer made of silicon nitride may be divided into two layers. FIG. 13 shows a modified embodiment of the present invention. In the infrared detecting element 1a shown in FIG. 13, a second structure layer 41 and a third structure layer 42 are formed between the first structure layer 22 and the oxide film 31. Namely, the second structure layer 41 made of silicon oxide and having a thickness of 5500 Å is deposited on the first structure layer 22 having a thickness of 1000 Å. The third structure layer 42 made of silicon nitride and having a thickness of 2000 Å is deposited on the second structure layer 41 by the same production method as the first structure layer 22. Furthermore, the oxide film 31 is formed on the third structure layer 42. The structure above the oxide film 31 and the production methods therefor are the same as the infrared detecting element 1.

In the infrared detecting element 1a, a film having a sufficient thickness for preventing bending of the membrane portion 4 can be divided into the first structure layer 22 and the third structure layer 42. Therefore, even when the thicknesses of the first structure layer 22 and the third structure layer 42 are set to prevent separation, stress in the tensile direction can easily be achieved in the membrane portion 4 as a whole. Namely, the membrane portion 4 is not bent, and thus measurement error of the thermopile 12 due to deformation of the membrane portion 4 can be decreased.

In this way, by using the structure layer made of silicon nitride, the membrane portion 4 can be further thinned, and deformation can be suppressed. Alternatively, deformation of the membrane portion 4 can be substantially completely prevented. Also, in the infrared detecting elements 1 and 1a, the diodes D1 and D2 for detecting the temperature of the cold junctions 18 are incorporated into the semiconductor substrate 2 by using the structure layer 22 made of silicon nitride for the element isolation region. Therefore, the temperature of the semiconductor substrate 2 can be determined directly by the diodes D1 and D2 in contact with the semiconductor substrate 2, and thus the reference temperature can be accurately obtained as compared with a conventional infrared detecting element comprising a packaged thermistor chip. Furthermore, since the two diodes D1 and D2 are provided to obtain the difference between the forward voltage drops, thereby permitting simple and accurate temperature measurement, as described above.

As described above, in the infrared detecting elements 1 and 1a of this embodiment, measurement error of the thermopile 12 due to deformation of the membrane portion 4 can be minimized, and the temperature of the cold junctions can be measured as the reference temperature with high accuracy. Therefore, measurement error is significantly decreased to permit temperature measurement with high accuracy. Since temperature measurement using diodes theoretically has no dependency on temperature, unlike the thermistor, correction is unnecessary. There is thus the merit that an infrared detecting element having a wide measurement range can be provided.

The diodes can be formed by using the first structure layer 22 made of silicon nitride, and error due to deformation of the membrane portion can be prevented, thereby simplifying the manufacturing process as described above, and permitting mass production by the semiconductor manufacturing process. Therefore, the infrared detecting element with high measurement accuracy can be provided at low cost.

Furthermore, in the infrared detecting elements 1 and 1a of this embodiment, the diodes D1 and D2 are arranged to surround the cold junctions 18 of the plurality of thermocouples 14 so that the average temperature of the cold junctions is detected. Therefore, the temperature of the cold junctions can be detected with higher accuracy. Also, electrodes are arranged along the conductive stripes which constitute the diodes D1 and D2 extending along the periphery in order to control the potential of the conductive stripes. This is a structure used for measuring the reference temperature with higher accuracy.

Figure 14:
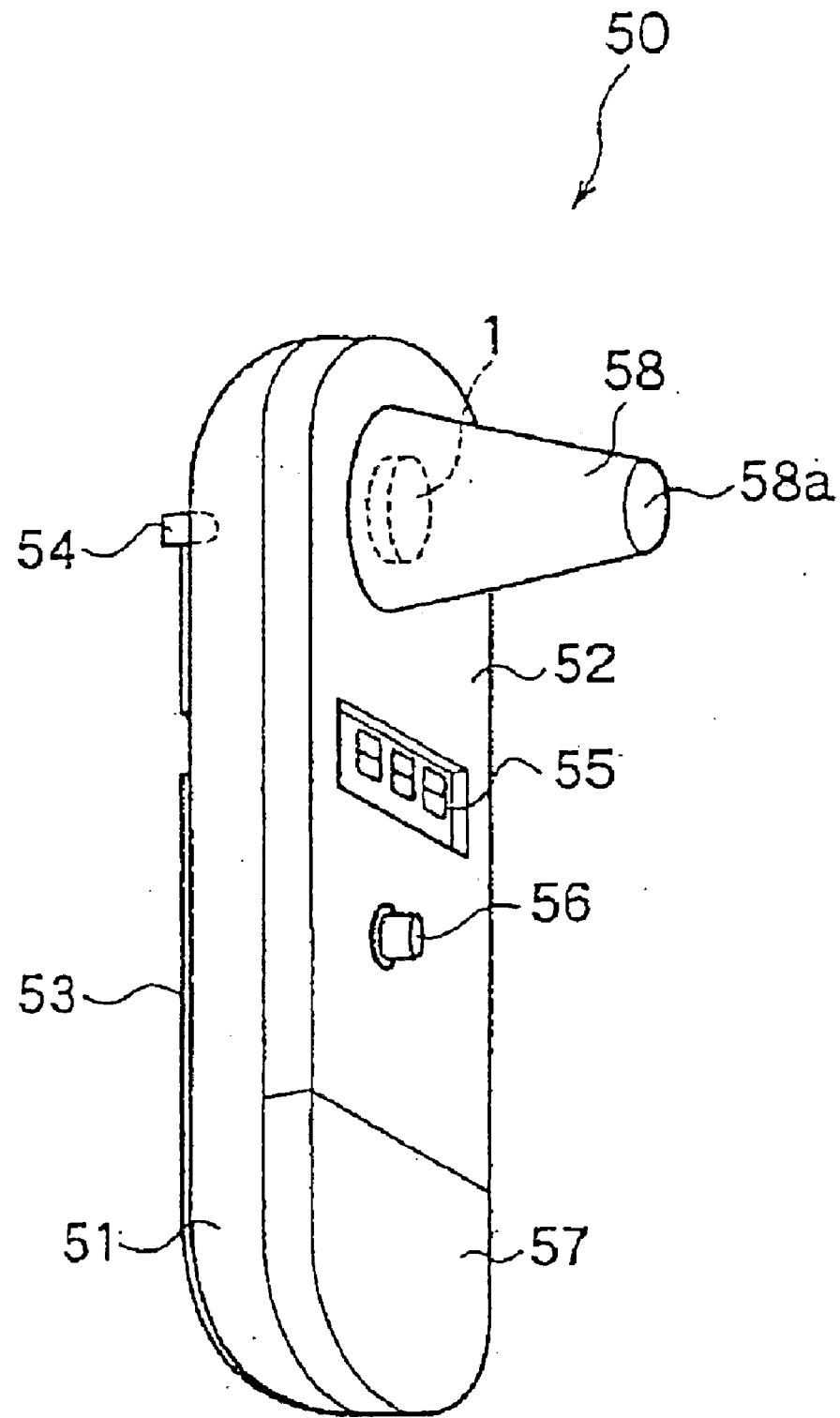
FIG. 14 is a drawing showing the appearance of a clinical ear thermometer using an infrared detecting element according to an embodiment of the present invention.

Therefore, by using the infrared detecting element 1 or 1a of this embodiment for forming a temperature measuring device such as a clinical thermometer or the like, a temperature measuring device capable of temperature measurement with high accuracy can be realized. FIG. 14 is a perspective view showing the appearance of a clinical ear thermometer using the infrared detecting element 1 of this embodiment. A clinical ear thermometer 50 of this embodiment comprises a housing 51 having an elongated shape easy to grasp with the flat of a hand, and a cylindrical probe 58 which can be inserted into an ear cavity, a LCD 55 for displaying the body temperature measured by the thermometer, a power on switch 56 and a battery box 57 are provided on the front face 52. The infrared detecting element 1 is contained in the housing 51 so that the infrared absorber 11 faces the distal tip 58a of the probe 58. Therefore, infrared radiation emitted in the ear cavity is received by the infrared absorber 11 of the infrared detecting element 1 through the probe 58 so that the temperature can be measured by the thermopile 12.

Therefore, when a measurement start switch 54 provided on the back 53 of the housing 51 of the clinical ear thermometer 50 is operated, output of the infrared detecting element 1, i.e., output of the thermopile 12, is corrected by the temperature determined from output of the diodes D1 and D2, or the temperature of the cold junctions 18, to display the body temperature (temperature) with high accuracy.

Figure 15:
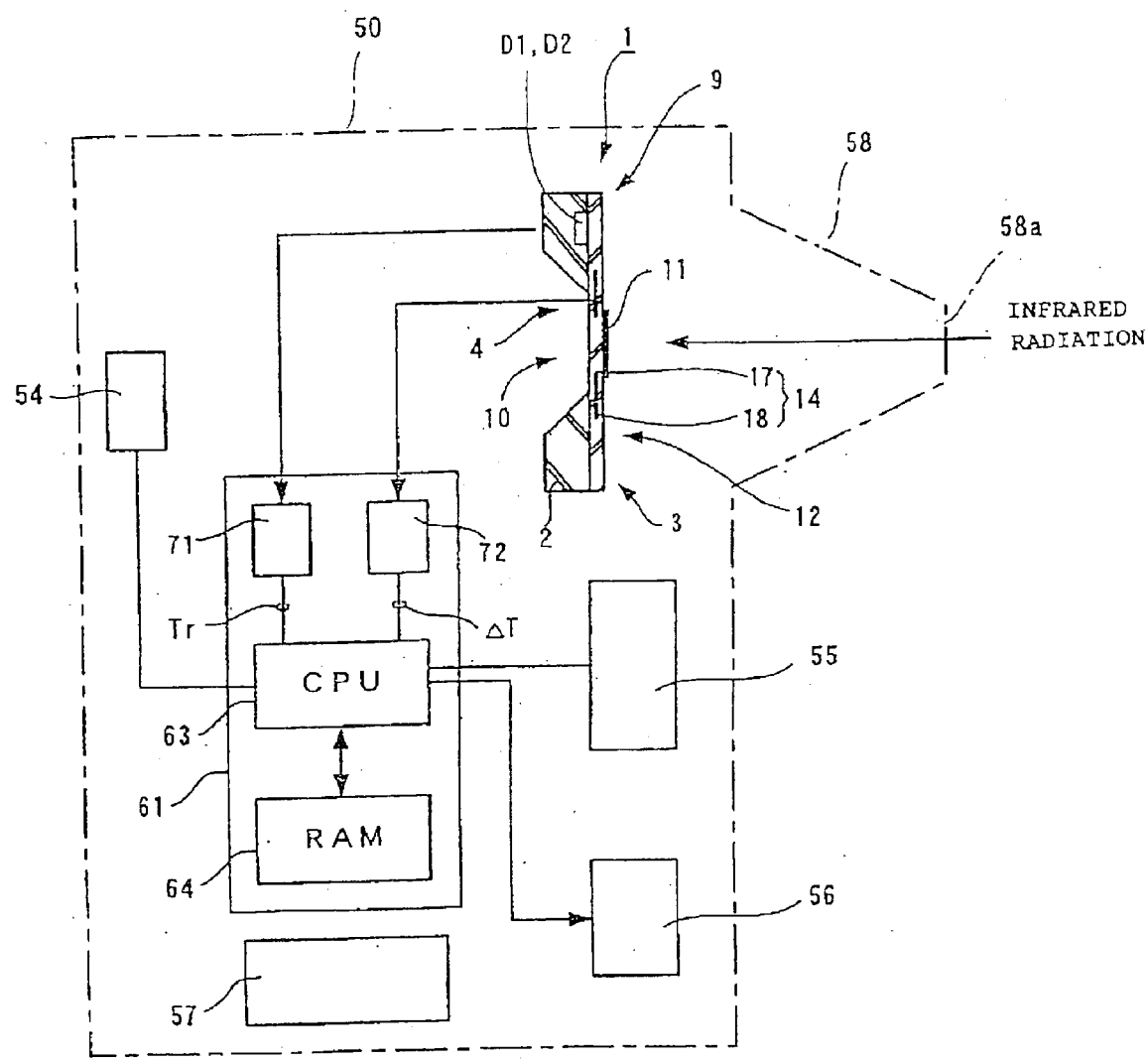
FIG. 15 is a block diagram showing the schematic configuration of the clinical ear thermometer shown in FIG. 14.

FIG. 15 is a block diagram showing the schematic circuit configuration of the clinical ear thermometer 50. The clinical ear thermometer 50 of this embodiment comprises a temperature derivation section 61 for calculating the temperature by using output from the infrared detecting element 1, the measurement start switch 54, the LCD 55, the power on switch 56, and the battery 57. The temperature derivation section 61 comprises a first data output section 71 for supplying the difference between the forward voltage drops of the diodes D1 and D2 as a signal indicating the temperature Tr of the cold junctions 18 of the thermopile 12 to a CPU 63, a second data output section 72 for outputting the output voltage of the thermopile 12 as a signal indicating the temperature difference $\Delta T$ between the cold junctions 18 and the hot junctions 17 to the CPU 63, the CPU 63 for deriving the body temperature from the temperature Tr and the temperature difference $\Delta T$ obtained from the data output sections 71 and 72, respectively, and controlling the entire thermometer, and a RAM 64 serving as work areas for various operations of the CPU 63. The temperature Tr of the cold junctions 18, which is determined by output from the diodes D1 and D2, is added to the temperature difference $\Delta T$ between the hot junctions 17 and the cold junctions 18, which is determined by output from the thermopile 12, to derive the body temperature. The derived body temperature is displayed on the LCD 55 provided on the front face 52 of the housing 51.

Since the above-described infrared detecting element 1 is incorporated into the clinical ear thermometer 50, the body temperature can be constantly measured with high accuracy based on the output of the thermopile 12 of the element 1 and the output of the diodes D1 and D2 with no influence of the operation environment. Also, the infrared detecting element 1 can be provided by using the semiconductor manufacture process at low cost, and thus the clinical ear thermometer 50 using the element 1 is compact and inexpensive. Therefore, the clinical thermometer 50 can easily be bought and used.

The infrared detecting elements 1 and 1a of this embodiment can be used not only for a clinical ear thermometer but also for other types of clinical thermometers, and other types of thermometer. The infrared detecting elements 1 and 1a are also compact and cost less, and are capable of temperature measurement with high accuracy, thereby widening the application range.

It is known that in a planar junction of a planar diode formed on a P-type silicon substrate having a planar electrode in a parallel plane, when the PN junction is formed by diffusing a N-type impurity in the surface layer of the P-type silicon substrate, and when an insulating layer of a silicon oxide film for element isolation is present on the surface of the silicon substrate, a N-type inversion layer is formed in the surface layer of the P-type silicon substrate below the insulating layer with a voltage applied to the PN junction, and a current flows between the insulating layer and the P-type silicon substrate through the N-type inversion layer (for example, "Electronics Gijutu Zensho [3], MOS Device" written by Takashi Tokuyama, p300 to 305, issued by Kogyo Chosa-kai Kabushiki Kaisha (Aug. 20, 1973)).

Therefore, when the planar diode is formed on the P-type silicon substrate, a reverse current increases in proportion to the area of the N-type inversion layer, and the reverse current deteriorates the forward characteristics of the diode to cause difficulties in accurate temperature measurement. As a result of study of the infrared detecting element 1 of this embodiment, the inventors found that the output voltages (forward voltages) of the semiconductors D1 and D2 were unstable to cause error in measured temperature. Thus, in order to obtain an infrared detecting element capable of temperature measurement with higher accuracy, the inventors developed an infrared detecting element using an N-type silicon substrate, as shown in FIG. 16.

Figure 16:
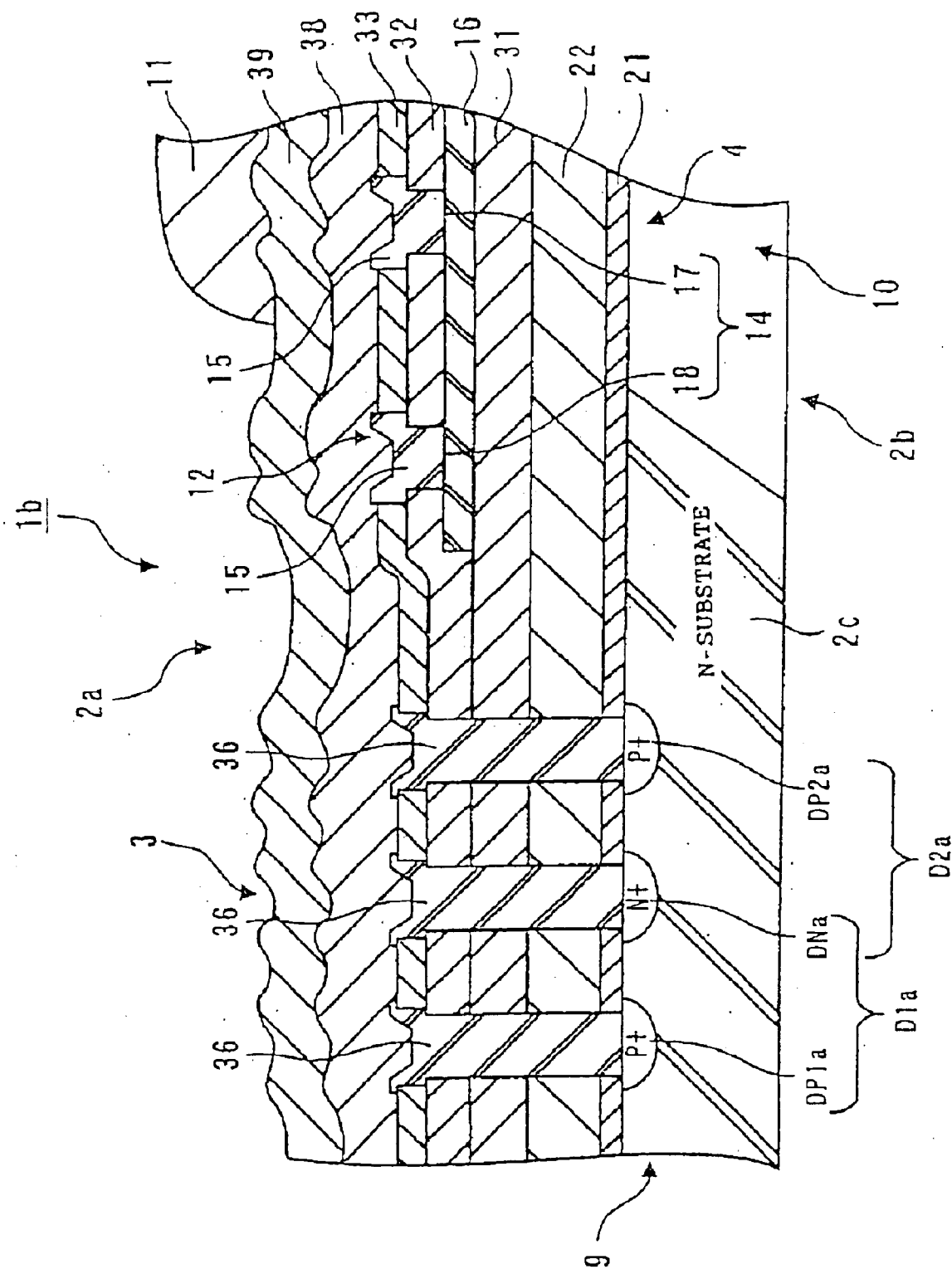
FIG. 16 is a partial cross-sectional view showing an infrared detecting element according to another embodiment of the present invention.

FIG. 16 is a partial sectional view showing an infrared detecting element according to another embodiment of the present invention. In FIG. 16, an infrared detecting element 1b comprises a silicon substrate 2c comprising an N-substrate in which an N-conduction type impurity (donor impurity) is diffused. In the infrared detecting element 1b, a first junction layer 21 made of silicon oxide, a first structure layer 22 made of silicon nitride, an oxide film 31 serving as a junction layer, an electrical conductor 16 made of polysilicon constituting a thermocouple 14, two silicon oxide films 32 and 33, and two surface protecting films 38 and 39 are laminated in turn on the N-type silicon substrate 2c from below, and an infrared absorber 11 is deposited on the surface protecting films 38 and 39. The first structure layer 22 made of silicon nitride comprises a film deposited by the low pressure (reduced pressure) CVD process, as with the aforementioned embodiment, to prevent the occurrence of bending of a membrane portion 4 supported by the first structure layer 22.

The central portion 10 of the semiconductor substrate 2c is etched from the low portion 2b to form the membrane portion 4. In the N-type silicon substrate 2c, the peripheral portion of the membrane portion 4 is left after etching to form a thick wall portion 3. The infrared detecting element 1b comprises P+ electrical conductor layers DP1a and DP2a formed by diffusing a P-conduction type impurity (acceptor impurity) such as boron or the like in the surface layer of the peripheral portion 9 of the N-type silicon substrate 2c, i.e., the thick wall portion 3. Also, an N+ electrical conductor layer DNa is provided by diffusing an N-conduction type impurity (donor impurity) such as phosphorus or the like between the electrical conductor layer DP1a and the electrical conductor layer DP2a.

These electrical conductor layers DP1a, DP2a and DNa constitute two diodes D1a and D2a. Namely, the electrical conductor layer DP1a forms the anode of the diode D1a, the electrical conductor layer DNa forms the cathode of the diode D1a. Also, the electrical conductor layer DNa also forms the cathode of the diode D2a, and the electrical conductor layer DP2a forms the anode of the diode D2a. Like in the above embodiment, the diodes D1a and D2a using the same cathode are provided to surround the cold junctions 18 of the thermopile 14.

Figure 17:
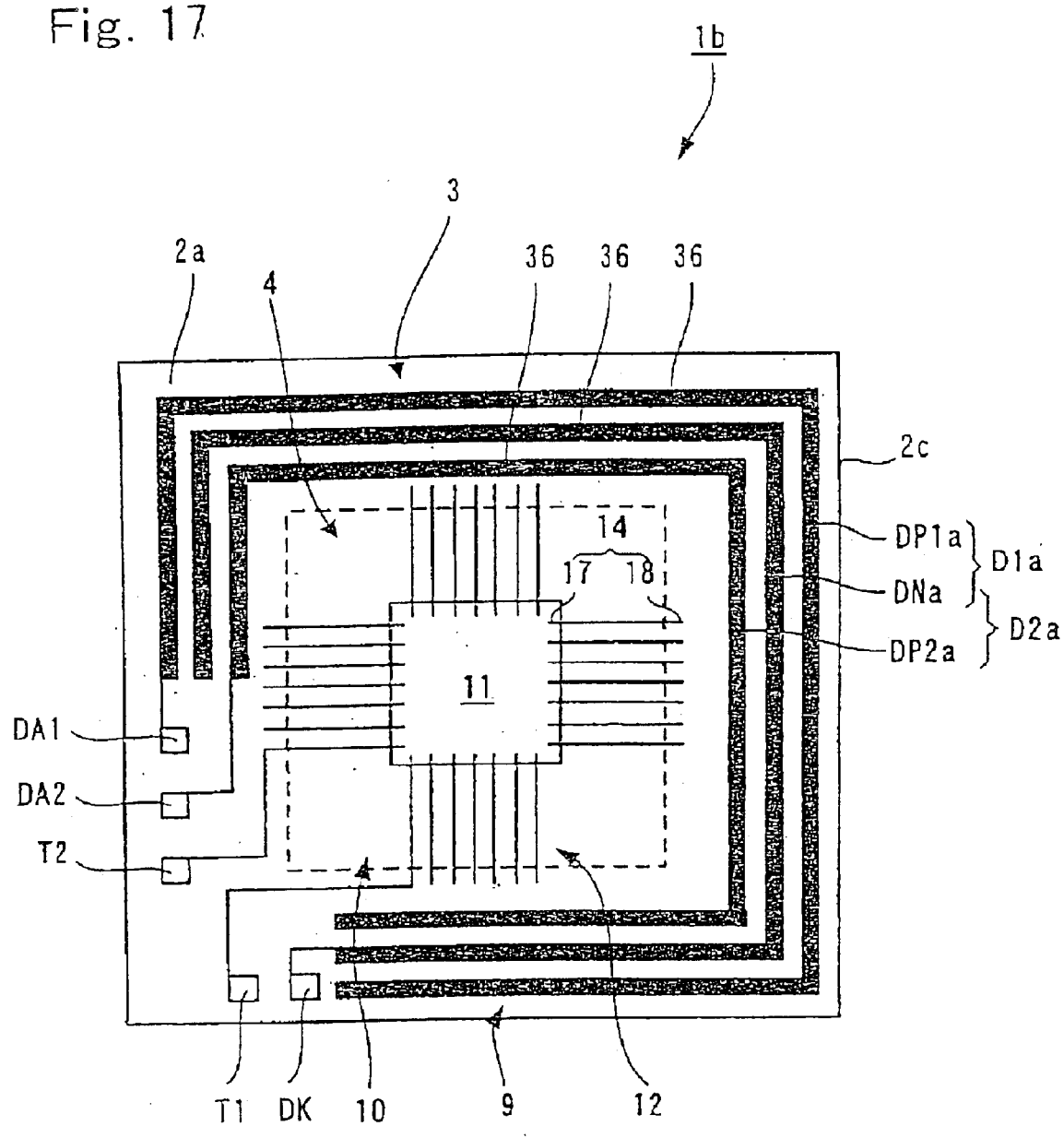
FIG. 17 is a drawing showing the surface-side construction of the infrared detecting element according to the embodiment of the present invention.

In the infrared detecting element 1b formed in the N-type silicon substrate 2c of this embodiment, as shown in FIG. 17, the electrical conductor layers DP1a and DP2a serving as the anodes of the diodes D1a and D2a are connected to anode terminals DA1 and DA2, and the electrical conductor layer DNa serving as the cathode is connected to a cathode terminal DK.

The infrared detecting element 1c of this embodiment can be formed by substantially the same method as the infrared detecting element 1 of the above-described embodiment. FIGS. 18 to 25 schematically show the process for manufacturing the infrared detecting element 1b of this embodiment.

Figure 18:
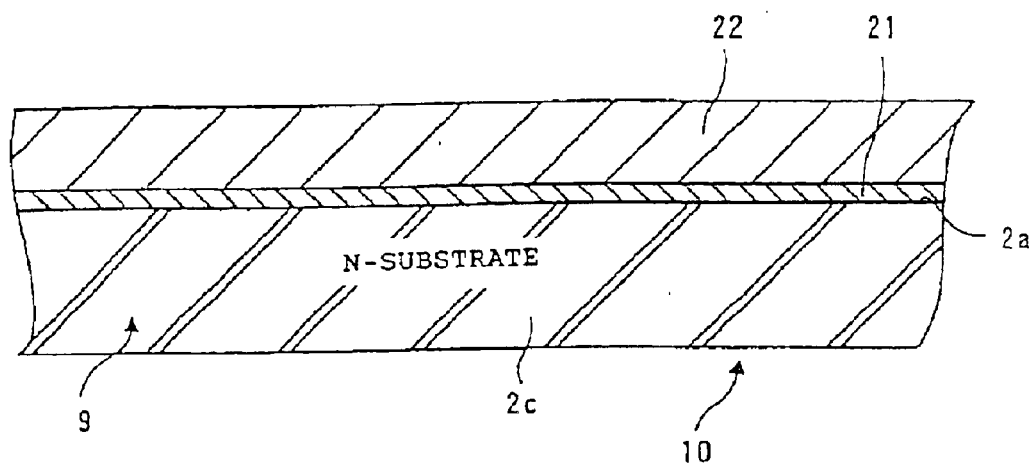
FIG. 18 is a drawing showing the step of forming a first structure layer on a silicon substrate in a process for manufacturing the infrared detecting element according to the embodiment of the present invention.

In manufacturing the infrared detecting element 1b of this embodiment, as shown in FIG. 18, the first junction layer 21 made of silicon oxide ($SiO_2$) having a thickness of as small as about 400 Å is formed on the upper surface 2a of the silicon substrate 2c by thermal oxidation. The first junction layer 21 comprises a film for increasing adhesion to the first structure layer 22 formed thereon, the film being thinner than a field oxide film deposited as a film for element isolation in a general semiconductor manufacturing process.

Next, the first structure layer 22 made of silicon nitride ($Si_3N_4$) and having a thickness of about 2500 Å is formed on the upper surface of the first junction layer 21 by the low pressure CVD process. The first structure layer 22 comprises a film having internal stress in the tensile direction, and can prevent bending when the N-type silicon substrate 2c is formed in a thin film.

Figure 19:
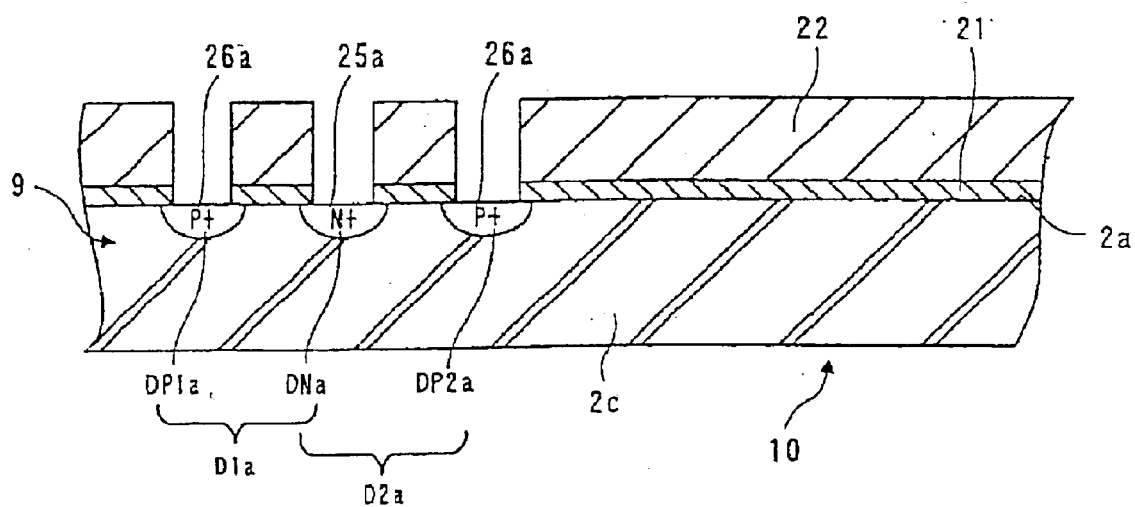
FIG. 19 is a drawing showing the step of forming a diode after the step shown in FIG. 18.

Next, a photoresist (not shown in the drawing) is applied on the first structure layer 22, and exposed and developed, and then the first structure layer 22 and the first junction layer 21 are patterned by etching using the photoresist (not shown in the drawing) as a mask, as shown in FIG. 19. Then, the diodes D1a and D2a are formed in the regions of the peripheral portion 9 of the N-type silicon substrate 2c, which are designed to form the diodes D1a and D2a, by using the first structure layer 22 for the isolation region. Therefore, phosphorus ion is implanted into the region 25a, where the first electrical conductor layer DNa is formed, with a high voltage of 80 KeV for acceleration to form the N+ diffusion layer (first electrical conductor layer) having an impurity concentration of $4 \times 10^{15}$ ion/cm$^2$. Also, boron ion is implanted into the regions 26a, where the second electrical conductor layers DP1a and DP2a are formed, with a high voltage of 35 KeV for acceleration to form the P+ diffusion layers (second electrical conductor layers) having an impurity concentration of $4 \times 10^{15}$ ion/cm$^2$.

After each of the electrical conductor layers is formed, annealing is performed under conditions of 900° C. and 20 min in order to recover the crystal defects produced in ion implantation and activate the impurities implanted into the regions 25a and 26a. Consequently, the diodes D1a and D2a isolated from each other by the first structure layer 22 are formed.

Figure 20:
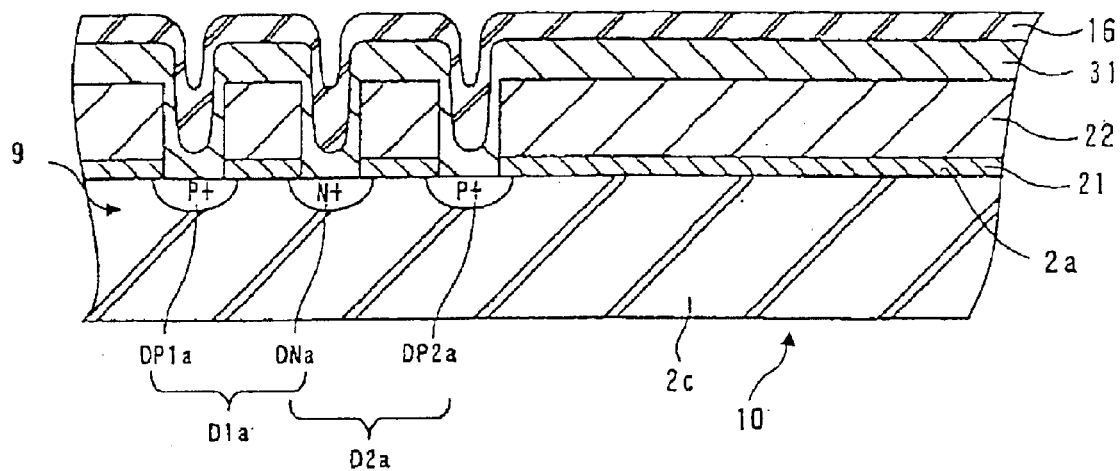
FIG. 20 is a drawing showing the step of forming an oxide film and an electrical conductor made of polysilicon on the first structure layer after the step shown in FIG. 19.
Figure 21:
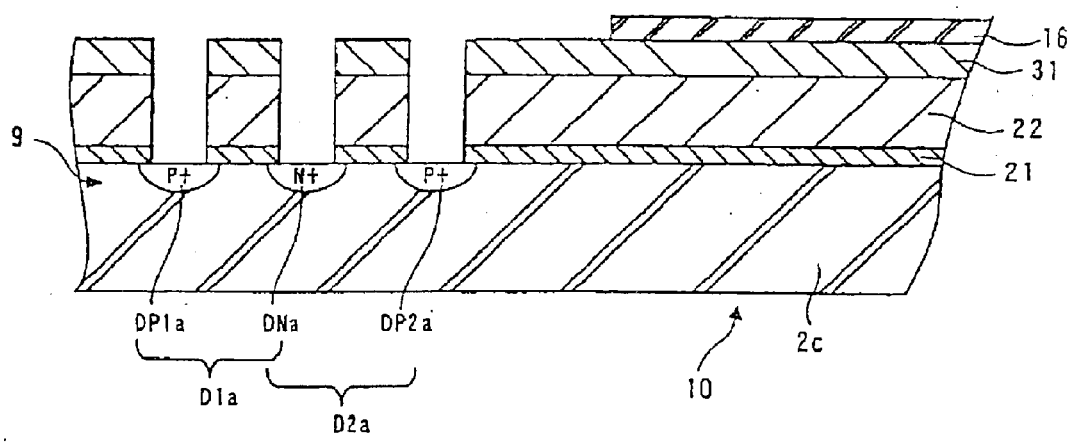
FIG. 21 is a drawing showing the step of patterning the electrical conductor made of polysilicon after the step shown in FIG. 20.

Next, as shown in FIG. 20, the oxide film (HTO: High Temperature Oxide) 31 having a thickness of about 1000 Å is formed by the high-temperature CVD process. Then, the polysilicon electrical conductor 16 constituting one of the electrical conductors of each of the thermocouples 14 is formed to a thickness of about 4000 Å on the oxide film 31 by using the CVD process using a silane ($SiH_4$) gas. Then, a photoresist is applied onto the polysilicon electrical conductor 16, and exposed and developed, and the polysilicon electrical conductor 16 is then patterned by etching using the photoresist as a mask to expose the electrical conductor layers DNa, DP1a and DP2a, as shown in FIG. 21.

Figure 22:
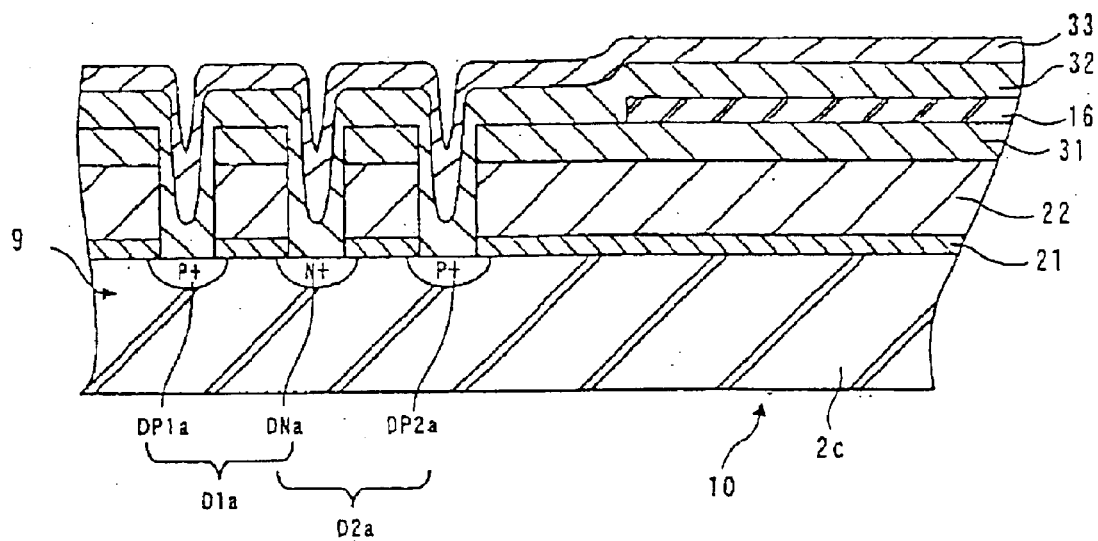
FIG. 22 is a drawing showing the step of forming two oxide films on the electrical conductor made of polysilicon after the step shown in FIG. 21.

Next, as shown in FIG. 22, the oxide film (HTO) 32 having a thickness of about 1000 Å is again deposited by the CVD process, and the oxide film (BPSG) 33 having a thickness of about 8000 Å is further deposited on the oxide film 32 by the CVD process. After the oxide film 33 is formed, the oxide film 33 is planarized by annealing under conditions of 900° C. and 20 min.

Figure 23:
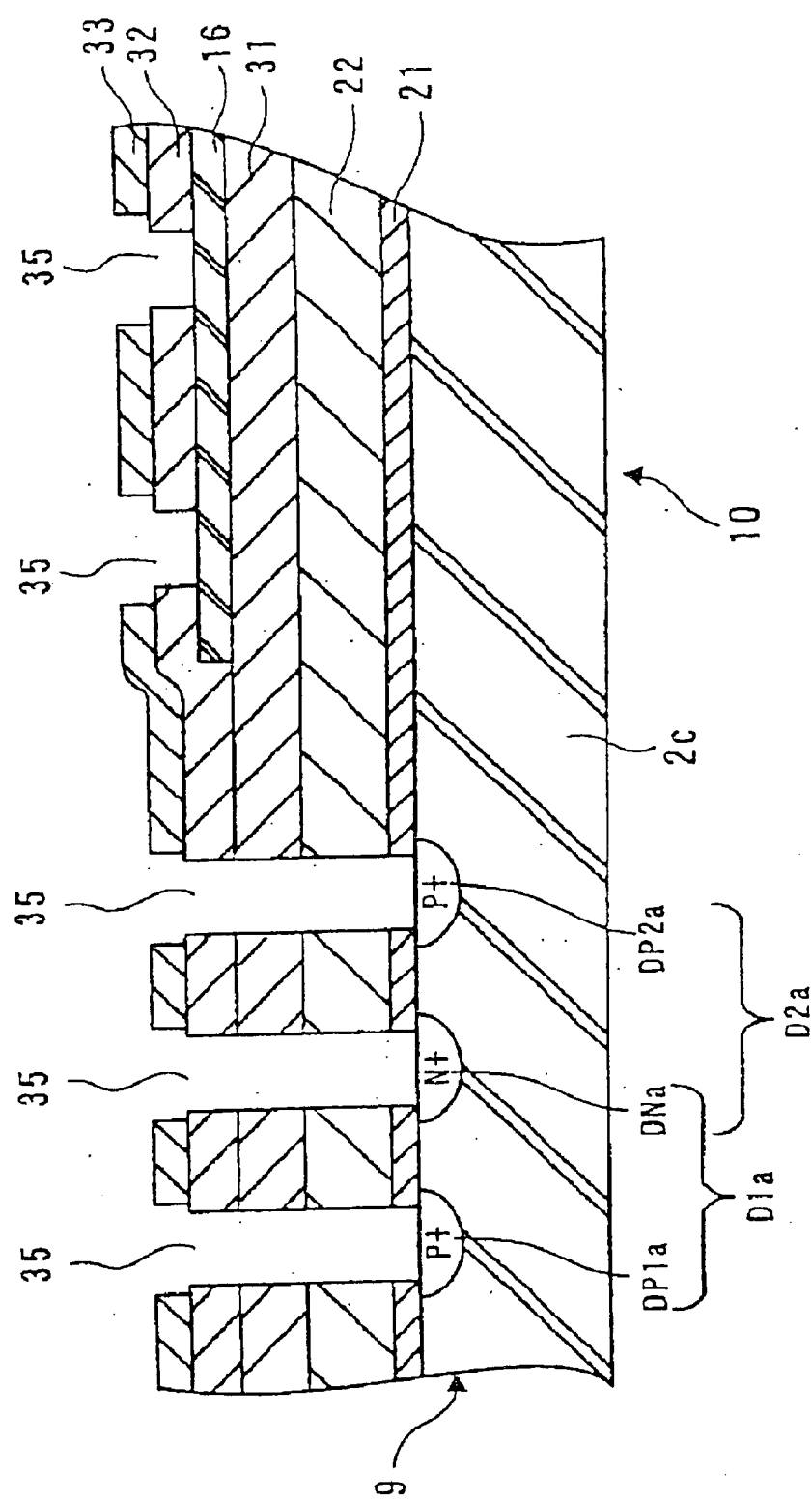
FIG. 23 is a drawing showing the step of patterning the two oxide films formed on the electrical conductor made of polysilicon after the step shown in FIG. 22.

After the surface of the deposited oxide film 33 is planarized to form a state in which an aluminum metal film can be formed without disconnection, a photoresist (not shown in the drawing) is applied onto the oxide film 33, and exposed and developed. Then, in order to achieve conduction between the diffusion layers (electrical conductor layers) DNa, DP1a and DP2a, and the polysilicon electrical conductor 16, which are formed in the N-type silicon substrate 2c, and a metal (aluminum metal), patterning 35 is performed by using the photoresist as a mask to expose the diffusion layers and the portions corresponding to the hot junctions 17 and the cold junctions 18 of the polysilicon electrical conductor 16, as shown in FIG. 23.

Figure 24:
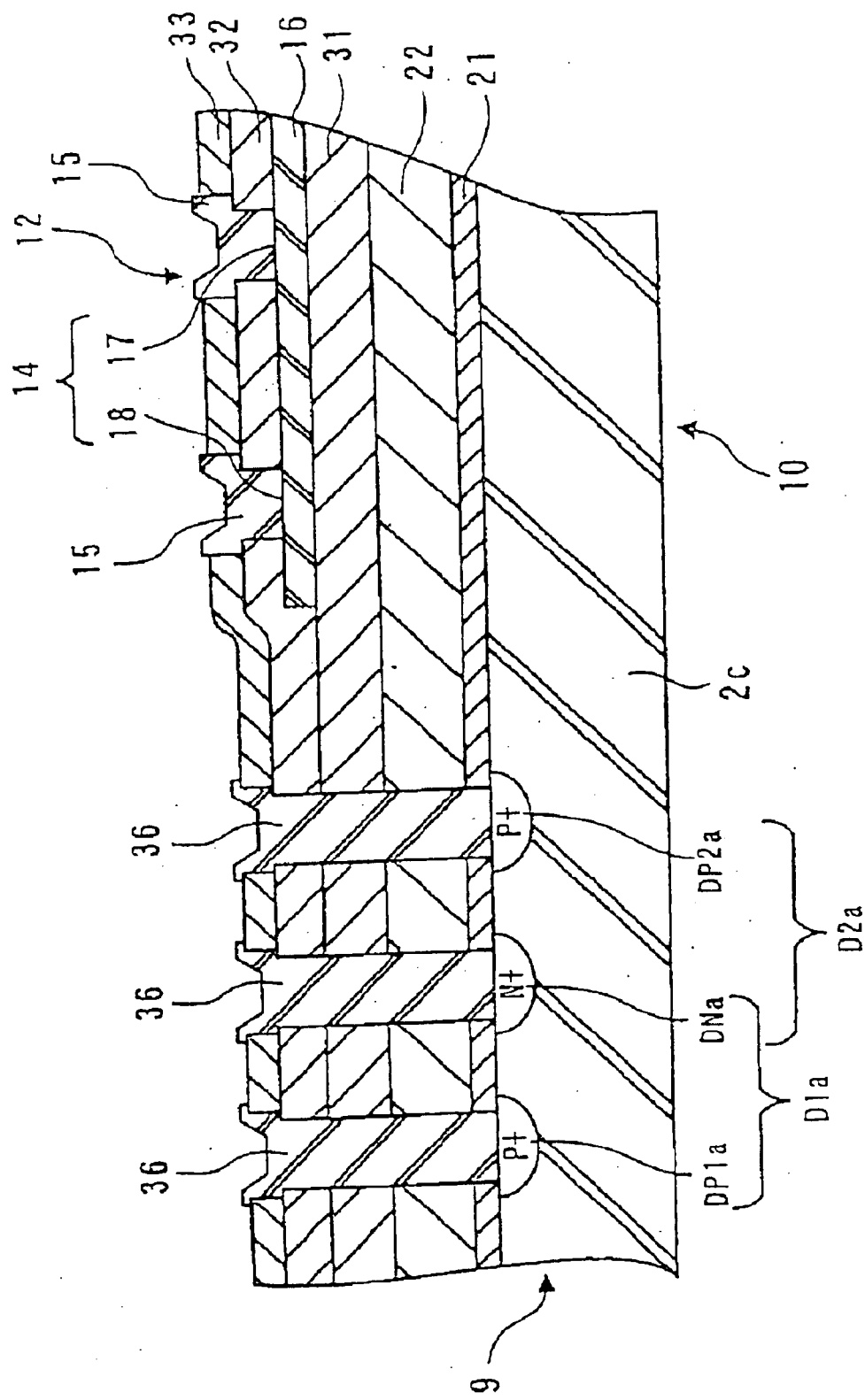
FIG. 24 is a drawing showing the step of forming a thermopile after the step shown in FIG. 23.

Next, aluminum is deposited from above on the oxide film 33 by sputtering vapor deposition so as to fill in the recesses formed by patterning to form an aluminum film (not shown in the drawing). Then, a photoresist is applied onto the aluminum film, and exposed and developed, and the aluminum film is patterned by etching using the photoresist as a mask to form the metal wiring 36 and the aluminum electrical conductor 15, as shown in FIG. 24. As a result, the aluminum electrical conductor 15 is connected to the polysilicon electrical conductor 16 to form the hot junctions 17 and the cold junctions 18. At the same time, the plurality of thermocouples 14 are connected in series to form the thermopile 12. In this way, the structure laminated on the upper surface 2a of the semiconductor substrate 2 is substantially completed.

Figure 25:
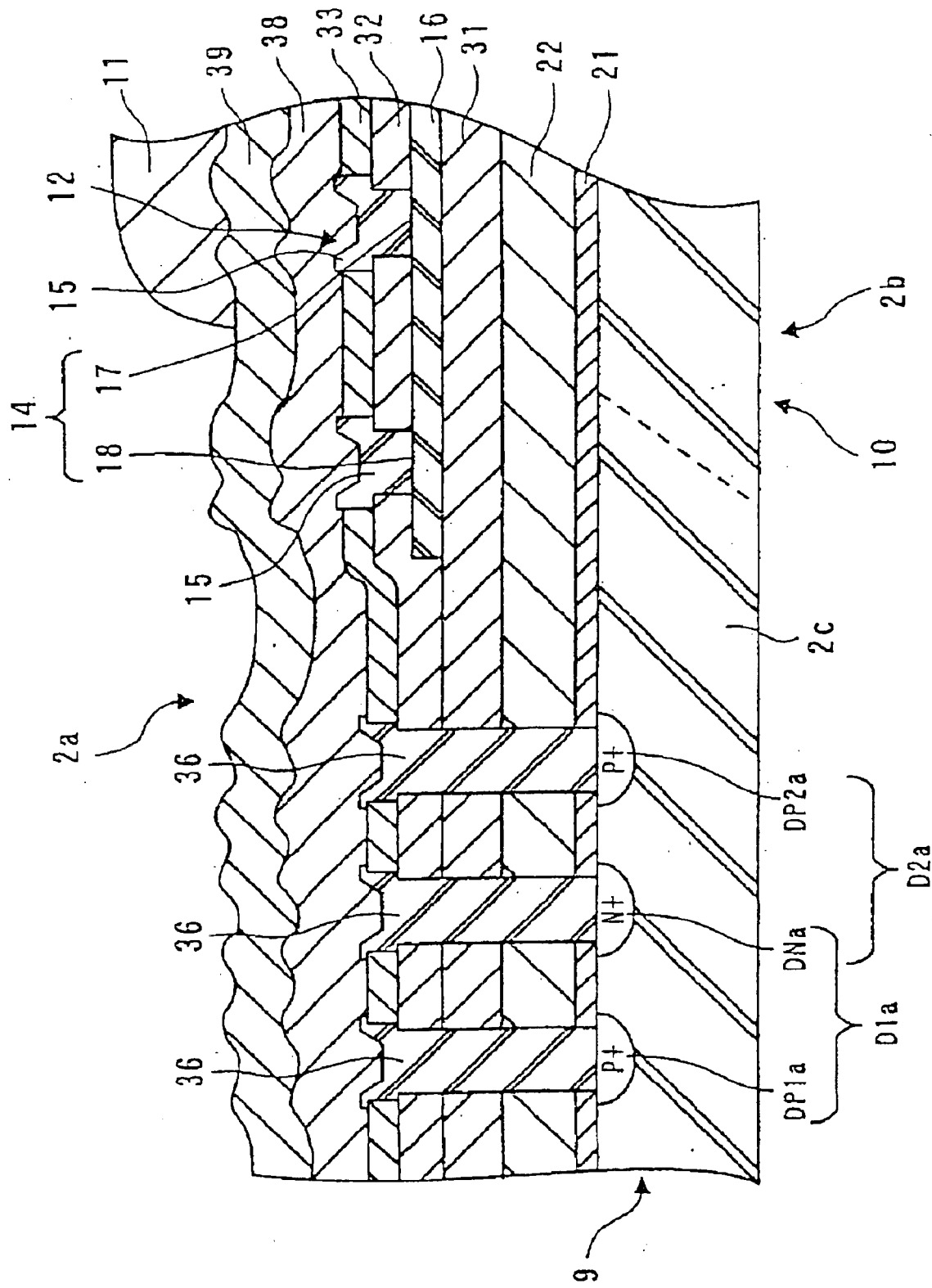
FIG. 25 is a drawing showing the step of forming two surface protecting films and an infrared absorber after the step shown in FIG. 24.
Figure 26:
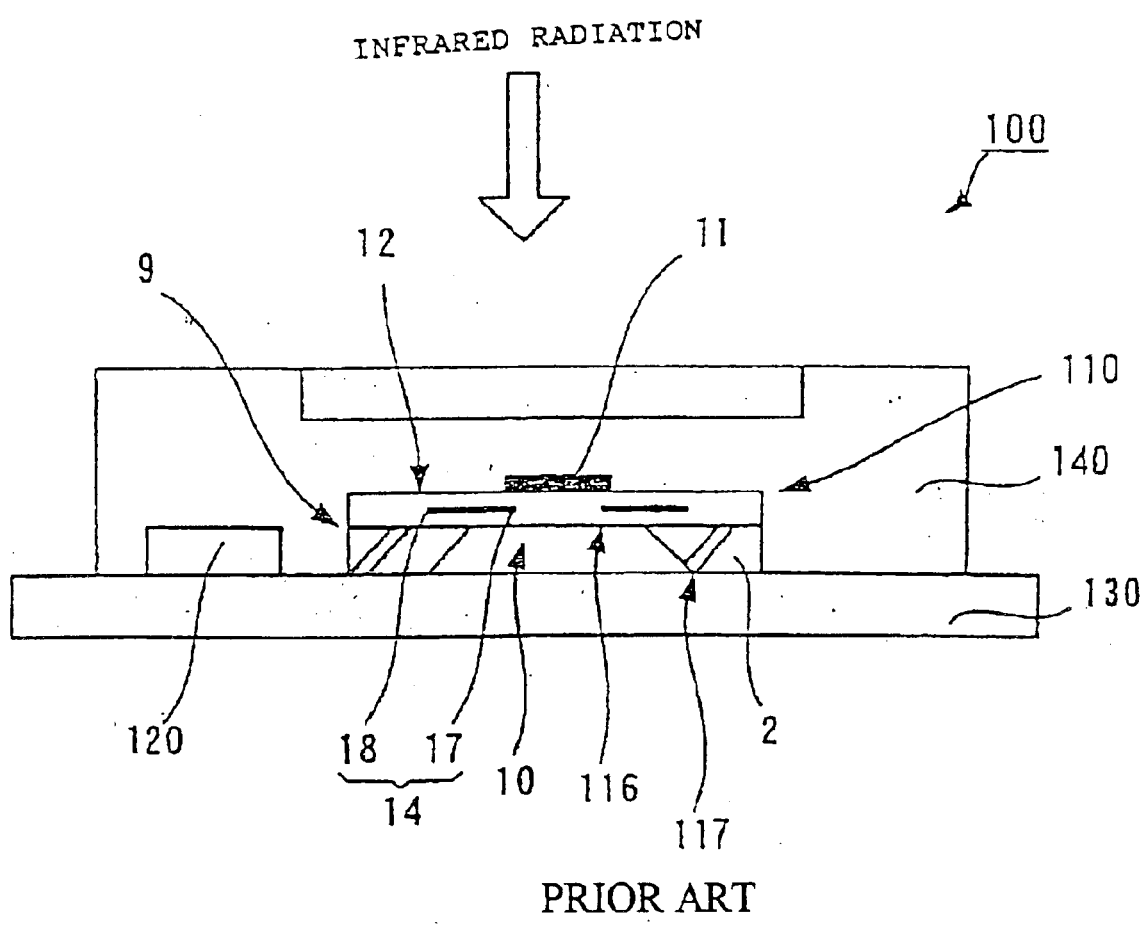
FIG. 26 is a drawing showing a conventional infrared detecting element.

Then, as shown in FIG. 25, the surface protecting film (PADA) 38 having a thickness of about 2000 Å is deposited by the plasma CVD process using a TEOS (tetraethyl orthosilicate) gas to cover the oxide film 33, the aluminum electrical conductor 15 and the metal wiring 36. After the film 38 is deposited, SOG (Spin On Glass) is applied and then baked under conditions of 400° C. and 30 min. As a result, the surface protecting film 38 is planarized. Furthermore, a plasma nitride film (SixNy) is deposited as the second surface protecting film (PADB) 39 having a thickness of about 1000 Å by a plasma enhanced CVD process on the surface protecting film 38.

Furthermore, gold black is deposited on the surface protecting film 39 to form the infrared absorber 11 having a thickness of about 1 to 10 $\mu$m. Finally, the lower portion 2b of the N-type silicon substrate 2c is masked to leave the central portion 10, and the central portion 10 of the N-type silicon substrate 2c is anisotropically etched with KOH or NaOH as the etchant from below. Consequently, the central portion 10 of the N-type silicon substrate 2c is removed to form the infrared detecting element 1c shown in FIG. 16.

In the infrared detecting element 1b formed by using the N-type silicon substrate 2c as described above, the N inversion layer is not formed below the first junction layer 21 to obtain the good forward characteristics of the diodes D1a and D2a. Also, the output voltages (forward voltages) of the diodes D1a and D2a are very stable as compared with the diodes formed on the P-type silicon substrate, and thus accurate temperature detection can be performed. Therefore, by using the infrared detecting element 1b of this embodiment, a temperature measuring device having high accuracy can be obtained.

Even when the N-type silicon substrate 1c is used, the second structure layer 41 made of silicon oxide and the third structure layer 42 made of silicon nitride shown in FIG. 13 may be provided between the first structure layer 22 and the oxide film 31.

As described above, in the present invention, a first structure layer made of silicon nitride instead of a field oxide film is formed on a semiconductor substrate. The first structure layer can be formed as a film having internal stress in the tensile direction by the low pressure CVD process, and thus bending of a membrane portion can be prevented. Also, the deformation of a thermopile formed on the first structure layer can be prevented to permit detection of a temperature difference with higher accuracy. Furthermore, PN junctions incorporated into the semiconductor substrate are isolated from each other by using the first structure layer, and thus the PN junctions can be simultaneously incorporated into the semiconductor substrate, for detecting the accurate temperature of cold junctions. Therefore, an infrared detecting element capable of detecting temperatures such as a body temperature and the like with high accuracy can be manufactured at low cost, and a compact temperature measuring device with high accuracy can be provided at low cost.

What is claimed is:

1. A method of manufacturing an infrared detecting element comprising:

forming a first structure layer made of silicon nitride on a semiconductor substrate;

patterning the first structure layer in the peripheral portion of the semiconductor substrate to form a PN junction on the surface of the semiconductor substrate;

forming a plurality of thermocouples on the first structure layer so that cold junctions are positioned in the peripheral portion, and hot junctions are positioned in the central portion of the semiconductor substrate, and connecting the thermocouples in series to form a thermopile; and etching out the central portion of the semiconductor substrate from below;

wherein the patterning to form the PN junction comprises forming the PN junction to surround at least half of the thermopile.

2. The method of manufacturing an infrared detecting element according to claim 1, further comprising forming an infrared absorber on the central portion of the semiconductor substrate so as to cover at least a portion of the thermopile above or near the hot junctions before the etching-out step.

3. The method of manufacturing an infrared detecting element according to claim 1, wherein the forming the first structure layer step comprises forming the first structure layer made of silicon nitride by low pressure CVD.

4. The method of manufacturing an infrared detecting element according to claim 3, further comprising forming a second structure layer made of silicon oxide on the first structure layer, and a third structure layer made of silicon nitride on the second structure layer.

5. The method of manufacturing an infrared detecting element according to claim 1, wherein the patterning to form the PN junction step comprises forming a plurality of the PN junctions constituting a plurality of diodes, wherein a pair of said diodes have a common anode region and separate cathode regions in said first structure layer.

6. The method of manufacturing an infrared detecting element according to claim 5, wherein a measure of the detected infrared energy is obtained, at least in part, by observing a difference in the magnitude of current through each diode in said pair of diodes.

7. The method of manufacturing an infrared detecting element according to claim 1, wherein said etched out central portion of the semiconductor substrate is shaped to have multiple sides and the patterning to form the PN junction step comprises forming the PN junction to surround at least part of every side of the central portion along the peripheral portion of the semiconductor substrate.

8. The method of manufacturing an infrared detecting element according to claim 7, wherein the patterning to form the PN junction step comprises forming electrodes on the upper surfaces of a first electrical conductor layer and a second electrical conductor layer of the PN junction so that the electrodes extend along the first and second electrical conductor layers.

9. The method of manufacturing an infrared detecting element according to claim 1, further comprising forming a first junction layer made of silicon oxide on the semiconductor substrate before forming the first structure layer.

10. The method of manufacturing an infrared detecting element according to claim 9, wherein the first junction layer is thinner than the first structure layer.

11. The method of manufacturing an infrared detecting element according to claim 1, further comprising forming a surface protecting film on the semiconductor substrate before the etching-out step.

12. An infrared detecting element comprising:
a semiconductor substrate having a central portion etched out from below;
a first structure layer made of silicon nitride, formed on the semiconductor substrate and having a membrane structure in the central portion;
a PN junction formed on the surface of the semiconductor substrate by patterning the first structure layer in the peripheral portion of the semiconductor substrate; and
a thermopile comprising a plurality of thermocouples formed on the first structure layer and connected in series so that cold junctions are positioned in the peripheral portion, and hot junctions are positioned in the central portion of the semiconductor substrate;
wherein the PN junction surrounds at least half of the thermopile.

13. The infrared detecting element according to claim 12, further comprising an infrared absorber formed on the central portion of the semiconductor substrate to cover at least a portion of the thermopile above or near the hot junctions.

14. The infrared detecting element according to claim 12, wherein the first structure layer comprises a film producing internal stress in the tensile direction.

15. The infrared detecting element according to claim 14, wherein the first structure layer is deposited by low pressure CVD.

16. The infrared detecting element according to claim 14, further comprising a second structure layer made of silicon oxide and a third structure layer made of silicon nitride, which are formed on the first structure layer.

17. The infrared detecting element according to claim 12, comprising a plurality of the PN junctions constituting a plurality of diodes, wherein a pair of said diodes have a common anode region and separate cathode regions in said first structure layer.

18. The infrared detecting element according to claim 17, wherein a measure of the detected infrared energy is obtained, at least in part, by observing a difference in the magnitude of current through each diode in said pair of diodes.

19. The infrared detecting element according to claim 12, wherein the membrane structure has multiple sides and the PN junction surrounds surround at least part of every side of the membrane along the peripheral portion of the semiconductor substrate.

20. The infrared detecting element according to claim 19, wherein the PN junction comprises electrodes extending along the upper surfaces of a first electrical conductor layer and a second electrical conductor layer of the PN junction.

21. The infrared detecting element according to claim 12, further comprising a first junction layer made of silicon oxide and formed between the first structure layer and the semiconductor substrate.

22. The infrared detecting element according to claim 21, wherein the first junction layer is thinner than the first structure layer.

23. The infrared detecting element according to claim 12, wherein the semiconductor substrate is an N conduction type.

24. A temperature measuring device comprising:
an infrared detecting element comprising:
a semiconductor substrate having a central portion etched out from below;
a first structure layer made of silicon nitride, formed on the semiconductor substrate and having a membrane structure in the central portion;
a PN junction formed on the surface of the semiconductor substrate by patterning the first structure layer in the peripheral portion of the semiconductor substrate; and
a thermopile comprising a plurality of thermocouples formed on the first structure layer and connected in series so that cold junctions are positioned in the peripheral portion, and hot junctions are positioned in the central portion of the semiconductor substrate;
wherein the PN junction surrounds at least half of the thermopile; and
a circuit that corrects the temperature of the cold junctions by a temperature determined by output from the PN junction of the infrared detecting element to determine a temperature based on output from the thermopile.

25. The temperature measuring device according to claim 24, further comprising a cylindrical portion with a distal tip that can be inserted into an ear cavity, wherein the infrared detecting element is disposed so that the upper surface of the central portion faces the distal tip of the cylindrical portion.

26. The temperature measuring device according to claim 25, wherein the infrared detecting element comprises an infrared absorber formed on the central portion to cover at least a portion of the thermopile above or near the hot junctions.

27. The temperature measuring device of claim 25, further having a pair of said PN junctions constituting a pair of diodes, wherein said pair of said diodes have a common anode region and separate cathode regions in said first structure layer.

28. The temperature measuring device of claim 27, wherein a measure of the detected infrared energy is obtained, at least in part, by observing a difference in the magnitude of current through each diode in said pair of diodes.

29. The temperature measuring device of claim 25, wherein the membrane has multiple sides the PN junction surrounds at least part of every side of the membrane along the peripheral portion of the semiconductor substrate.

* * * * *